(12) United States Patent
Tanaka et al.

(10) Patent No.: US 11,978,848 B2
(45) Date of Patent: May 7, 2024

(54) METHOD FOR PRODUCING SOLID ELECTROLYTE

(71) Applicant: IDEMITSU KOSAN CO., LTD., Tokyo (JP)

(72) Inventors: Shinji Tanaka, Ichihara (JP); Fumio Yamakawa, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 248 days.

(21) Appl. No.: 17/330,508

(22) Filed: May 26, 2021

(65) Prior Publication Data

US 2021/0376377 A1 Dec. 2, 2021

(30) Foreign Application Priority Data

May 27, 2020 (JP) .................. 2020-092748

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0065* (2013.01)

(58) Field of Classification Search
CPC ....... H01M 10/0562; H01M 2300/008; H01M 2300/0065; H01M 10/0525; Y02P 70/50; C01P 2002/72
See application file for complete search history.

(56) References Cited

U.S. PATENT DOCUMENTS

| | | | | |
|---|---|---|---|---|
| 9,620,811 | B2 * | 4/2017 | Kambara | H01M 10/0562 |
| 10,637,095 | B2 * | 4/2020 | Kim | H01M 10/0525 |
| 2014/0004257 | A1 * | 1/2014 | Kubo | H01M 10/0562 |
| | | | | 427/126.1 |

FOREIGN PATENT DOCUMENTS

| | | | | |
|---|---|---|---|---|
| CN | 109786816 A | * | 5/2019 | |
| JP | 2014191899 A | | 10/2014 | |
| WO | WO-2014192309 A1 | | 12/2014 | |
| WO | WO-2017159667 A1 | | 9/2017 | |
| WO | WO-2018054709 A1 | | 3/2018 | |
| WO | WO-2018110647 A1 | * | 6/2018 | ............. C01B 25/14 |

OTHER PUBLICATIONS

Sigma Aldrich Safety Data Sheet: Heptane (Year: 2023).*
Sigma Aldrich Scientific Safet Data Sheet: triethyl amine (Year: 2023).*
Modified translation CN-109786816-A as taught bt Ceng (Year: 2019).*
Sigma Aldrich, Product Specification, ethylenediaminetetraacetic acid (Year: 2023).*
Modified translation of WO2018110647A1 as taught by Maruyama (U.S. Appl. No. 11/502,331B2) (Year: 2018).*
Ghaani, M.R., Mohtasebi, A.M., Tajeri, R., Marashi, P.—A Comparison of the Role of the Chelating Agent on the Structure of Lithium Conducting Solid Electrolyte Li1.4Al1.4Ti0.6(PO4)3: Pechini vs. Modified Pechini-Type Methods, Batteries, 2020, 6, 48 (Year: 2020).*
Stefan J. Sedlmaier et al., "Li4PS4I: A Li+ Superionic Conductor Synthesized by a Solvent-Based Soft Chemistry Approach", Chemistry of Materials, No. 29, 2017, pp. 1830-1835.

* cited by examiner

*Primary Examiner* — Anca Eoff
(74) *Attorney, Agent, or Firm* — Element IP, PLC.

(57) ABSTRACT

The invention is to provide a novel method for producing a solid electrolyte having a high ionic conductivity according to a liquid-phase method. The production method for a solid electrolyte includes mixing a raw material inclusion containing a lithium atom, a sulfur atom, a phosphorus atom and a halogen atom with a complexing agent and a solvent, wherein the amount of the complexing agent is 0.1 mL or more and 4.0 mL or less relative to 1 g of the total mass of the raw material inclusion.

21 Claims, 3 Drawing Sheets

METHOD FOR PRODUCING SOLID ELECTROLYTE

FIELD OF THE INVENTION

The present invention relates to a method for producing a solid electrolyte.

BACKGROUND OF THE INVENTION

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a solid electrolyte to be used for a solid electrolyte layer is roughly classified into a solid-phase method and a liquid-phase method. Furthermore, as for the liquid-phase method, there are a homogeneous method in which a solid electrolyte material is completely dissolved in a solvent; and a heterogeneous method in which a solid electrolyte material is not completely dissolved in a solvent but undergoes through a suspension of solid-liquid coexistence. For example, as the solid-phase method, a method in which raw materials, such as liquid sulfide and diphosphorus pentasulfide are subjected to mechanical milling treatment using an apparatus, such as a ball mill and a bead mill and optionally subjected to heat treatment, thereby producing an amorphous or crystalline solid electrolyte is known (see, for example, PTL 1). In accordance with this method, the solid electrolyte is obtained by applying a mechanical stress to the raw materials, such as lithium sulfide, to promote the reaction of the solids with each other.

On the other hand, as for the homogeneous method regarding the liquid-phase method, a method in which a solid electrolyte is dissolved in a solvent and redeposited is known (see, for example, PTL 2). In addition, as for the heterogeneous method, a method in which solid electrolyte raw materials, such as lithium sulfide, are allowed to react in a solvent containing a polar aprotic solvent is known (see, for example, PTLs 3 and 4 and NPL 1). For example, PTL 4 discloses that a production method of a solid electrolyte having an $Li_4PS_4I$ structure includes a step in which dimethoxyethane (DME) is used and bound with the $Li_3PS_4$ structure, to give $Li_4PS_4$-DME. The resultant solid electrolyte has an ionic conductivity of $5.5 \times 10^{-5}$ S/cm ($3.9 \times 10^{-4}$ S/cm in the calcium-doped product). Toward practical use of an all-solid-state battery, the liquid-phase method is recently watched as a method in which it can be synthesized simply and in a large amount in addition to versatility and applicability.

CITATION LIST

Patent Literature

PTL 1: WO 2017/159667 A
PTL 2: JP 2014-191899 A
PTL 3: WO 2014/192309 A
PTL 4: WO 2018/054709 A

Non-Patent Literature

NPL 1: CHEMISTRY OF MATERIALS, 2017, No. 29, pp. 1830-1835

SUMMARY OF THE INVENTION

Technical Problem

However, as for the conventional solid-phase method accompanied with mechanical milling treatment, the solid-phase reaction is the center, and the solid electrolyte is readily given in a high purity, and thus, a high ionic conductivity can be realized. On the other hand, as compared with the solid-phase synthesis method, the liquid-phase method has a problem that a high ionic conductivity is difficult to realize.

In view of the aforementioned circumstances, the present invention has been made, and an object thereof is to provide a novel production method for producing a solid electrolyte having a high ionic conductivity according to a liquid-phase method.

Solution to Problem

In order to solve the aforementioned problem, the present inventor made extensive and intensive investigations. As a result, it has been found that the foregoing problem can be solved by the following invention.

According to a method including mixing a raw material inclusion containing a lithium atom, a sulfur atom, a phosphorus atom and a halogen atom with a complexing agent and a solvent, wherein the amount of the complexing agent is 0.1 mL or more and 4.0 mL or less relative to 1 g of the total mass of the raw material inclusion, a homogeneous electrolyte precursor can be given, and a solid electrolyte having a high ionic conductivity can be given.

The volume (mL) of the complexing agent is a volume thereof at room temperature (23° C.).

Specifically, the present invention provides the following [1] to [21].

[1] A method for producing a solid electrolyte, including mixing a raw material inclusion containing a lithium atom, a sulfur atom, a phosphorus atom and a halogen atom with a complexing agent and a solvent, wherein the amount of the complexing agent is 0.1 mL or more and 4.0 mL or less relative to 1 g of the total mass of the raw material inclusion.

[2] The method for producing a solid electrolyte according to [1], wherein the solubility of a lithium halide at 25° C. in the solvent is smaller than the solubility of the lithium halide at 25° C. in the complexing agent.

[3] The method for producing a solid electrolyte according to [1], including removing the liquid component of the complexing agent, after mixing.

[4] The method for producing a solid electrolyte according to [1], wherein the boiling point of the solvent is higher than the boiling point of the complexing agent.

[5] The method for producing a solid electrolyte according to [1], wherein the solvent contains two or more solvent species and at least one solvent species has a boiling point higher than that of the complexing agent.

[6] The method for producing a solid electrolyte according to [3], including producing a slurry of the solvent and an electrolyte precursor by removal of the liquid component of the complexing agent.

[7] The method for producing a solid electrolyte according to [1], wherein the solubility of a lithium halide at 25° C. in the solvent is less than 0.5 g/100 ml.

[8] The method for producing a solid electrolyte according to [1], wherein the solvent contains an ether solvent or a hydrocarbon solvent.

[9] The method for producing a solid electrolyte according to [8], wherein the hydrocarbon solvent contains one or more selected from an aliphatic hydrocarbon solvent, an alicyclic hydrocarbon solvent and an aromatic hydrocarbon solvent.

[10] The method for producing a solid electrolyte according to [6], including further removing the solvent from the slurry of the solvent and the electrolyte precursor to give the electrolyte precursor.

[11] The method for producing a solid electrolyte according to [1], wherein the raw material inclusion contains two or more kinds of halogen atoms.

[12] The method for producing a solid electrolyte according to [1], wherein the raw material inclusion contains one or more kinds of lithium halides.

[13] The method for producing a solid electrolyte according to [1], wherein the raw material inclusion contains at least one kind selected from lithium sulfide, phosphorus sulfide, a phosphorus halide, a halogen molecule, amorphous $Li_3PS_4$ and crystalline $Li_3PS_4$.

[14] The method for producing a solid electrolyte according to [1], wherein the complexing agent contains a hetero atom-having compound.

[15] The method for producing a solid electrolyte according to [1], wherein the complexing agent contains an amino group-having compound.

[16] The method for producing a solid electrolyte according to [1], wherein the complexing agent contains a compound having at least two tertiary amino groups in the molecule.

[17] The method for producing a solid electrolyte according to [6], further including heating the electrolyte precursor.

[18] The method for producing a solid electrolyte according to [6], wherein the content of the complex in the electrolyte precursor is 30 to 80% by mass based on the total amount of the electrolyte precursor.

[19] The method for producing a solid electrolyte according to [1], using the solvent in an amount of 0.1 to 50 mL relative to the total mass, 1 g of the raw material inclusion.

[20] The method for producing a solid electrolyte according to [1], wherein the solid electrolyte contains a thio-LISICON Region II-type crystal structure.

[21] The method for producing a solid electrolyte according to [1], wherein the solid electrolyte does not have a diffraction peak at 2θ=17.5° and 26.1° in X-ray diffractometry using a CuKα ray.

Advantageous Effects of the Invention

According to the present invention, there can be provided a solid electrolyte having a high ionic conductivity and an electrolyte precursor.

DETAILED DESCRIPTION OF THE INVENTION

Figure 1:
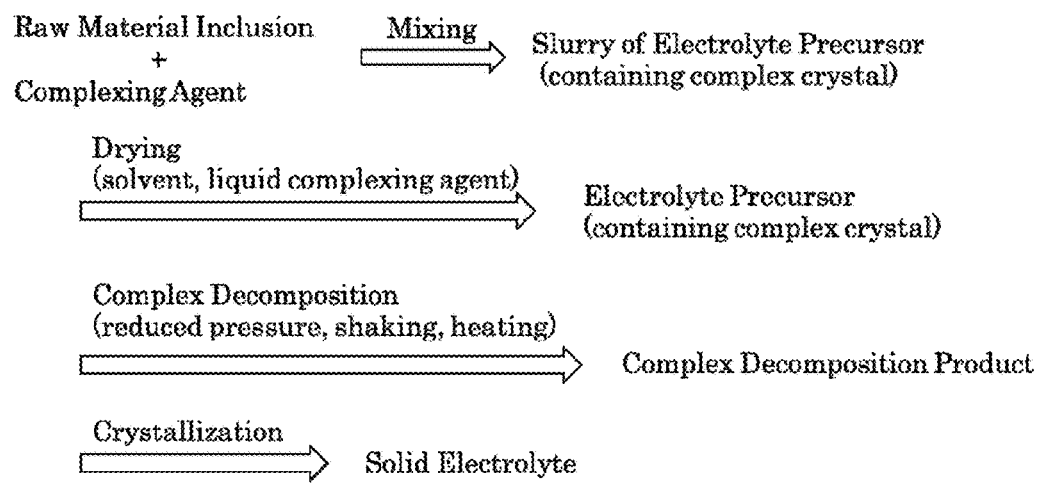
FIG. 1 is a flow chart of explaining one example of a preferred mode of a production method of the present embodiment.

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

[Production Method of Solid Electrolyte]

The present embodiment incudes mixing a raw material inclusion containing a lithium atom, a sulfur atom, a phosphorus atom and a halogen atom with a complexing agent and a solvent, wherein the amount of the complexing agent is 0.1 mL or more and 4.0 mL or less relative to 1 g of the total mass of the raw material inclusion.

The present inventors have found that the problem relating to an ionic conductivity in a liquid-phase method is caused by the dispersibility and the uniformity of solid electrolyte components accompanied by dissolution of the components, and have reached the present invention. For example, according to a homogeneous method, the raw materials or the solid electrolyte is once completely dissolved, and thus, the components can be homogeneously dispersed in the liquid. But, in the subsequent deposition step, the deposition proceeds according to an inherent solubility of each of the components, and thus, it is extremely difficult to perform the deposition while keeping the dispersed state of the components. As a result, each of the components is separated and deposited. In particular, the tendency is strong for halogen components. As a result of further investigations, the present inventors have found that, especially when the amount of the complexing agent to be used is increased, the halogen component is dissolved out by the complexing agent that remains as a liquid component (without forming a complex) after the foregoing mixing.

In PTL 3, a polar aprotic solvent is used but the amount of the polar aprotic solvent used is 5 mL or so relative to 1 g of the total mass of the raw materials for the solid electrolyte, and in PTL 4, a polar solvent is used but the amount of the polar solvent used is 15 mL or so relative to 1 g of the total mass of the raw materials for the solid electrolyte, and in these, halogen components dissolved out. On the other hand, in a homogeneous method, the affinity between the solvent and lithium is too strong, and therefore the solvent could hardly be removed in drying after precipitation. From these, the homogeneous method is problematic in that the ionic conductivity of the resultant solid electrolyte lowers greatly.

Also in a heterogeneous method of solid-liquid coexistence, it has been known that a part of the solid electrolyte is dissolved, and thus, separation takes place owing to dissolution of a specified component so that, like in the homogeneous method, the solvent could hardly be removed and a desired solid electrolyte is difficult to obtain.

Given the situation, in the present embodiment, the amount of the complexing agent to be used is controlled to be 0.1 mL or more and 4.0 mL or less relative to the raw material inclusion so as to suppress dissolution of a specified component, that is, a halogen component.

FIG. 1 is a flow chart showing an outline of the production method of the present embodiment. By mixing a raw material inclusion, a complexing agent and a solvent, a slurry that contains an electrolyte precursor is provided, and as needed, this is further dried to give a powdery electrolyte precursor, which is then heated to give an amorphous or, depending on the heating condition, crystalline solid electrolyte.

Using a specific amount of a complexing agent as combined with a solvent, a slurry of an electrolyte precursor is provided to give a homogeneous solid electrolyte having a high ionic conductivity. The effects that the amount of the complexing agent used could have some influence on the amount of the halogen component that dissolves out and could therefore have some influence also on the ionic conductivity of the resultant solid electrolyte and that, by reducing more the amount of the complexing agent to be used, the ionic conductivity can be improved are surprising effects that could not be anticipated even by those skilled in the art.

The "solid electrolyte" as referred to in this specification means an electrolyte of keeping the solid state at 25° C. in a nitrogen atmosphere. The solid electrolyte in the present embodiment is a solid electrolyte containing a lithium atom, a sulfur atom, a phosphorus atom, and a halogen atom and having an ionic conductivity to be caused owing to the lithium atom.

In the "solid electrolyte", both of a crystalline solid electrolyte having a crystal structure and an amorphous solid electrolyte, which are obtained by the production method of the present embodiment, are included. The crystalline solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline solid electrolyte contains a crystal structure derived from the solid electrolyte, in which a part thereof may be a crystal structure derived from the solid electrolyte, or all of them may be a crystal structure derived from the solid electrolyte. The crystalline solid electrolyte may be one in which an amorphous solid electrolyte is contained in a part thereof so long as it has the X-ray diffraction pattern as mentioned above. In consequence, in the crystalline solid electrolyte, a so-called glass ceramics which is obtained by heating the amorphous solid electrolyte to a crystallization temperature or higher is contained.

The amorphous solid electrolyte as referred to in this specification is a halo pattern in which other peak than the peaks derived from the materials is not substantially observed in an X-ray diffraction pattern in the X-ray diffractometry, and it is meant that the presence or absence of peaks derived from the raw materials of the solid electrolyte does not matter.

(Raw Material Inclusion)

The present embodiment needs a raw material inclusion. The raw material inclusion which is used in the present embodiment is one containing a lithium atom, a sulfur atom, a phosphorus atom, and a halogen atom.

As the raw materials to be contained in the raw material inclusion, for example, a compound containing at least one of a lithium atom, a sulfur atom, a phosphorus atom, and a halogen atom can be used, and a compound containing two or more kinds of halogen atoms is preferred. The halogen atom is preferably a chlorine atom, a bromine atom and an iodine atom, more preferably a bromine atom and an iodine atom.

More specifically, representative examples of the foregoing compound include raw materials composed of at least two atoms selected from the aforementioned four atoms, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); solid electrolytes such as amorphous $Li_3PS_4$ or crystalline $Li_3PS_4$ obtained from lithium sulfide and phosphorus sulfide and having, as a molecular structure, a $PS_4$ structure; and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), preferably chlorine ($Cl_2$), bromine ($Br_2$), and iodine ($I_2$), more preferably bromine ($Br_2$), and iodine ($I_2$).

Preferably, the raw material inclusion contains at least one kind of lithium halide, more preferably 2 or more kinds of lithium halides.

The lithium halide is preferably lithium chloride, lithium bromide and lithium iodide, more preferably lithium bromide and lithium iodide. Also preferably, lithium bromide and lithium iodide are used as combined.

Further, the raw material inclusion contains at least one kind selected from lithium sulfide, phosphorus sulfide, a phosphorus halide and a halogen molecule.

In the present embodiment, preferably, a lithium halide is used for introducing a halogen atom into the solid electrolyte, along with a complexing agent and a solvent, and therefore in that manner, separation of halogen atoms does not occur in the step of solvent removal to be mentioned hereinunder and a solid electrolyte having a high ionic conductivity is favorably obtained. Also in addition, when at least one kind selected from lithium sulfide, phosphorus sulfide, a phosphorus halide, a halogen molecule, amorphous $Li_3PS_4$ and crystalline $Li_3PS_4$ is preferably used, and in that manner, a solid electrolyte having a high ionic conductivity can also be favorably obtained.

As materials which may be used as the raw material inclusion other than those mentioned above, a compound containing not only at least one atom selected from the aforementioned four atoms (lithium atom, sulfur atom, phosphorus atom and halogen atom) but also other atom than the foregoing four atoms can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; solid electrolytes, such as amorphous $Li_3PS_4$ and crystalline $Li_3PS_4$; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$).

In the present embodiment, from the viewpoint of more easily obtaining a solid electrolyte having a high ionic conductivity, the following compounds are preferred for the raw material inclusion. That is, phosphorus sulfides, such as lithium sulfide, diphosphorus trifluoride ($P_2S_3$), and diphosphorus pentasulfide ($P_2S_5$); halogen simple substances (halogen molecules), such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred. Preferred examples of a combination of raw materials include a combination of lithium sulfide, diphosphorus pentasulfide, and a lithium halide; and a combination of lithium sulfide, phosphorus pentasulfide, and a halogen simple substance, in which the lithium halide is preferably lithium bromide or lithium iodide, and the halogen simple substance is preferably bromine or iodine.

The lithium sulfide which is used in the present embodiment is preferably a particle.

An average particle diameter ($D_{50}$) of the lithium sulfide particle is preferably 10 μm or more and 2,000 μm or less, more preferably 30 μm or more and 1,500 μm or less, and still more preferably 50 μm or more and 1,000 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, among the above-exemplified raw materials, the solid raw material is preferably one having an average particle diameter of the same degree as in the aforementioned lithium sulfide particle, namely one having an average particle diameter falling within the same range as in the aforementioned lithium sulfide particle is preferred.

In the case of using lithium sulfide, diphosphorus pentasulfide, and the lithium halide as the raw material inclusion, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw material inclusion, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the aforementioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content (α mol %) of the halogen simple substance and the content (β mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \leq (2\alpha + \beta) \leq 100 \quad (2)$$

$$4 \leq (2\alpha + \beta) \leq 80 \quad (3)$$

$$6 \leq (2\alpha + \beta) \leq 50 \quad (4)$$

$$6 \leq (2\alpha + \beta) \leq 30 \quad (5)$$

In the case of using two halogen simple substances, when the molar number in the substance of the halogen atom of one side is designated as A1, and the molar number in the substance of the halogen atom of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

As described above, lithium sulfide and diphosphorus pentasulfide can be used individually, and for example, according to the method described in the section of Examples, $Li_3PS_4$ can be previously prepared and used. In that case, the amount of $Li_3PS_4$ to be used can be replaced with the total amount of lithium sulfide and diphosphorus pentasulfide used as the raw materials in preparing $Li_3PS_4$.

(Complexing Agent)

In the present embodiment, a complexing agent is used. The complexing agent as referred to in this specification is a substance capable of forming a complex together with the lithium atom and means one having such properties of acting with the lithium atom-containing sulfide and the halide, contained in the aforementioned raw materials, thereby promoting formation of the electrolyte precursor.

As the complexing agent, any material can be used without being particularly restricted so long as it has the aforementioned properties. In particular, preferred is a compound having an atom that has a high affinity for a lithium atom, for example, a hetero atom such as a nitrogen atom, an oxygen atom, and a chlorine atom, and more preferred is a compound having a group that contains these hetero atoms. This is because these hetero atoms and groups containing these hetero atoms can readily form a coordination (bond) with lithium. The hetero atom to be contained in the complexing agent is preferably a nitrogen atom. In the case where the complexing agent contains any other hetero atom (e.g., oxygen atom) than a nitrogen atom, preferably, the complexing agent contains such other hetero atoms than a nitrogen atom along with a nitrogen atom, rather than containing the other hetero atoms alone than a nitrogen atom.

A nitrogen atom tends to have a higher bonding force of coordination bond with lithium, as compared with any other hetero atom, and therefore in the case where a complexing agent containing a nitrogen atom and a compound containing any other hetero atom than a nitrogen atom are used as combined, the compound containing the other hetero atom can function as a solvent rather than as a complexing agent. In the case where a complexing agent containing a nitrogen atom is not used, the complexing agent containing the other hetero atom functions as a complexing agent.

Since the hetero atom of the molecule of the complexing agent has a high affinity for a lithium atom, it may be considered that the nitrogen atom that is a hetero atom in the molecule has a high affinity with the lithium atom, and the complexing agent has such properties of binding with the lithium-containing structure which is existent as a main structure in the solid electrolyte obtained by the present production method, such as $Li_3PS_4$ containing representatively a $PS_4$ structure, and the lithium-containing raw materials, such as a lithium halide, thereby easily forming an aggregate. For that reason, by mixing the aforementioned raw material inclusion and the complexing agent, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen atom is more likely dispersed and fixed is obtained, and as a result, it may be considered that a solid electrolyte having a high ionic conductivity is obtained.

Accordingly, the complexing agent preferably has at least two coordination-bonding hetero atoms in the molecule, more preferably at least two groups having such hetero atoms in the molecule. Having at least two hetero atom-containing groups in the molecule, the complexing agent can act to bond a lithium-containing structure, such as $Li_3PS_4$ containing a $PS_4$ structure, and a lithium-containing raw material, such as a lithium halide, via the at least two hetero atoms in the molecule, and accordingly, the halogen atom is more likely dispersed and fixed in the electrolyte precursor. As a result, a solid electrolyte having a high ionic conductivity, in which the generation of hydrogen sulfide is suppressed, is obtained. Among hetero atoms, a nitrogen atom is preferred, and an amino group is preferred as a nitrogen atom-containing group. That is, the complexing agent is preferably an amino group-containing compound.

The amine compound having an amino group in the molecule is not specifically limited since it can promote electrolyte precursor formation, but the complexing agent preferably contains a compound having at least two tertiary amino groups in the molecule.

In view of the fact that the complexing agent has such a structure, the lithium-containing structure, such as $Li_3PS_4$ containing a $PS_4$ structure, and the lithium-containing raw material, such as a lithium halide, can be bonded to each other via at least two nitrogen atoms in the molecule, and the halogen atom is more likely dispersed and fixed in the electrolyte precursor. As a result, a solid electrolyte having a high ionic conductivity is obtained.

Examples of such an amine compound include amine compounds, such as aliphatic amines, alicyclic amines, heterocyclic amines, and aromatic amines, and these amine compounds can be used alone or in combination of plural kinds thereof.

More specifically, as the aliphatic amine, aliphatic diamines, such as aliphatic primary diamines, such as ethylenediamine, diaminopropane, and diaminobutane; aliphatic secondary diamines such as N,N'-dimethylethylenediamine, N,N'-diethylethylenediamine, N,N'-dimethyldiaminopropane, and N,N'-diethyldiaminopropane; aliphatic tertiary diamines, such as N,N,N',N'-tetramethyldiaminomethane, N,N,N',N'-tetramethylethylenediamine (TMEDA), N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane, are representatively preferably exemplified. Here, in the exemplification in this specification, for example, when the diaminobutane is concerned, it should be construed that all of isomers inclusive of not only isomers regarding the position of the amino group, such as 1,2-diaminobutane, 1,3-diaminobutane and 1,4-diaminobutane, but also linear or branched isomers and so on regarding the butane are included unless otherwise specifically noted.

The carbon number of the aliphatic amine is preferably 2 or more, more preferably 4 or more, and still more preferably 6 or more, and an upper limit thereof is preferably 10 or less, more preferably 8 or less, and still more preferably 7 or less. In addition, the carbon number of the hydrocarbon group of the aliphatic hydrocarbon group in the aliphatic amine is preferably 2 or more, and an upper limit thereof is preferably 6 or less, more preferably 4 or less, and still more preferably 3 or less.

As the alicyclic amine, alicyclic diamines, such as alicyclic primary diamines, such as cyclopropanediamine, and cyclohexanediamine; alicyclic secondary diamines, such as bisaminomethylcyclohexane; alicyclic tertiary diamines, such as N,N,N',N'-tetramethyl-cyclohexanediamine, and bis(ethylmethylamino)cyclohexane, are representatively preferably exemplified. As the heterocyclic diamine, heterocyclic diamines, such as heterocyclic primary diamines, such as isophoronediamine; heterocyclic secondary diamines, such as piperazine, and dipiperidylpropane; heterocyclic tertiary diamines, such as N,N-dimethylpiperazine, and bismethylpiperidylpropane, are representatively preferably exemplified.

The carbon number of each of the alicyclic amine and the heterocyclic amine is preferably 3 or more, and more preferably 4 or more, and an upper limit thereof is preferably 16 or less, and more preferably 14 or less.

As the aromatic amine, aromatic diamines, such as aromatic primary diamines, such as phenyldiamine, tolylenediamine, and naphthalenediamine; aromatic secondary diamines, such as N-methylphenylenediamine, N,N'-dimethylphenylenediamine, N,N'-bismethylphenylphenylenediamine, N,N'-dimethylnaphthalenediamine, and N-naphthylethylenediamine; and aromatic tertiary diamines, such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine, are representatively preferably exemplified.

The carbon number of the aromatic amine is preferably 6 or more, more preferably 7 or more, and still more preferably 8 or more, and an upper limit thereof is preferably 16 or less, more preferably 14 or less, and still more preferably 12 or less.

The amine compound which is used in the present embodiment may also be one substituted with a substituent, such as an alkyl group, an alkenyl group, an alkoxy group, a hydroxy group, and a cyano group, or a halogen atom.

While the diamines have been exemplified as specific examples, needless to say, the amine compound which may be used in the present embodiment is not limited to the diamines, and for example, aliphatic monoamines corresponding to trimethylamine, triethylamine, ethyldimethylamine, and various diamines such as the above-mentioned aliphatic diamines; and also piperidine compounds such as piperidine, methylpiperidine, and tetramethylpiperidine; pyridine compounds such as pyridine, and picoline; morpholine compounds such as morpholine, methylmorpholine, and thiomorpholine; imidazole compounds such as imidazole, and methylimidazole; alicyclic monoamines, such as monoamines corresponding to the above-mentioned alicyclic diamines; heterocyclic monoamines corresponding to the above-mentioned heterocyclic diamines; aromatic monoamines corresponding to the above-mentioned aromatic diamines; and further polyamines having 3 or more amino groups, such as diethylenetriamine, N,N',N''-trimethyldiethylenetriamine, N,N,N',N'',N''-pentamethyldiethylenetriamine, triethylenetetramine, N,N'-bis[(dimethylamino)ethyl]-N,N'-dimethylethylenediamine, hexamethylenetetramine, and tetraethylenepentamine, are also usable herein.

Among those described above, from the viewpoint of obtaining a higher ionic conductivity, tertiary diamines having a tertiary amino group as the amino group are preferred, tertiary diamines having two tertiary amino groups are more preferred, tertiary diamines having two tertiary amino groups on both ends are still more preferred, and aliphatic tertiary diamines having a tertiary amino group on both ends are yet still more preferred. In the aforementioned amine compounds, as the aliphatic tertiary diamine having a tertiary amino group on the both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

The other complexing agent than the amine compound, for example, a compound having a group containing a hetero atom, such as an oxygen atom or a halogen atom, e.g., a chlorine atom, has a high affinity with a lithium atom, and such a compound is exemplified as the other complexing agent than the amine compound. In addition, a compound having any other group than an amino group that contains a nitrogen atom as the hetero atom, for example, having a nitro group or an amide group provides the same effects.

Examples of the other complexing agent include alcohol solvents such as ethanol, and butanol; ester solvents such as ethyl acetate, and butyl acetate; aldehyde solvents such as formaldehyde, acetaldehyde, and dimethylformamide; ketone solvents such as acetone, methyl ethyl ketone, and cyclohexanone; ether solvents such as tetrahydrofuran, dimethoxyethane, diethoxyethane, cyclopentyl methyl ether, tert-butyl methyl ether, and anisole; glycol ester solvents such as 2-methoxyethyl acetate, 2-ethoxyethyl acetate (ethylene glycol acetate), 2-methoxy-1-methyl ethyl acetate, 2-ethoxy-methylethyl acetate, 2-(2-ethoxyethoxy)ethyl acetate, (2-acetoxyethoxy)methyl acetate, 1-methyl-2-ethoxyethyl acetate (propylene glycol monoethyl ether acetate), ethyl 3-methoxypropionate, ethyl 3-ethoxypropionate, and 2-methoxyethyl 3-(2-methoxyethoxy)propionate; halogen atom-containing aromatic hydrocarbon solvents such as trifluoromethylbenzene, nitrobenzene, chlorobenzene, chlorotoluene, and bromobenzene; and solvents containing a carbon atom and a hetero atom, such as acetonitrile, dimethylsulfoxide, and carbon disulfide. Among these, ether solvents and glycol ester solvents are preferred, and glycol ester solvents are more preferred. Among ether solvents, tetrahydrofuran is more preferred; among glycol ester solvents, acetates are more preferred, and 2-methoxy-1-methylethyl acetate and 2-ethoxy-1-methylethyl acetate are more preferred.

As described above, in the case where a nitrogen-containing complexing agent is used as combined, the other hetero atom-containing solvent that is exemplified as the above-mentioned "other complexing agent" functions also as a solvent, and therefore these are handled as a solvent. On the other hand, in the case where a nitrogen-containing complexing agent is not used as combined, these function as a "complexing agent", and are therefore handled as a complexing agent. For example, in Examples to be given hereinunder, TMEDA and dibutyl ether are used as combined, and in this case, TMEDA functions as a complexing agent but dibutyl ether does not almost function as a complexing agent though it could not be said that dibutyl ether does not function at all as a complexing agent, and therefore in this case, dibutyl ether is handled as a solvent.

Regarding the complexing agent, preferably, the solubility of a lithium halide at 25° C. in a solvent is smaller than the solubility of a lithium halide at 25° C. in the complexing agent. Regarding the complexing agent, not only from the viewpoint of complex formation as mentioned above, but also from the viewpoint of suppressing dissolution of a lithium halide from a slurry of an precursor electrolyte in removing the liquid component of the complexing agent as described below, it is desirable that the solubility of a lithium halide at 25° C. in a solvent is smaller than the solubility of a lithium halide at 25° C. in the complexing agent. The complexing agent can be appropriately selected and used in consideration of the solubility of a lithium halide at 25° C. in the complexing agent and the boiling point of the complexing agent.

Preferably, the solubility of a lithium halide at 25° C. in the complexing agent is larger than the solubility thereof in a solvent. From the viewpoint of suppressing dissolution of a lithium halide from an electrolyte precursor to facilitate production of a solid electrolyte having a high ionic conductivity, the solubility is preferably 0.001 g/100 mL or more, more preferably 0.005 g/100 mL or more, even more preferably 0.001 mg/100 mL or more, and from the viewpoint of mixing in a heterogeneous system, the solubility is preferably 30 g/100 mL or less, more preferably 20 g/100 mL of less, even more preferably 10 mg/100 mL or less. The solubility of a lithium halide (g/100 mL) means a mass of a lithium halide relative to 100 mL of the complexing agent at 25° C., and in the case of using plural lithium halides, the solubility is defined as the solubility of the lithium halide that has a highest solubility among the plural lithium halides as combined with the complexing agent.

For example, in one example given hereinunder, tetramethylethylenediamine is used as a complexing agent, and lithium bromide and lithium iodide are used as lithium halides. In this case, the solubility of lithium iodide in tetramethylethylenediamine is larger than that of lithium bromide therein, and therefore, the solubility of lithium bromide is the objective one. Briefly, the solubility of lithium bromide in tetramethylethylenediamine is 1 g/100 mL or more.

The amount of the complexing agent to be used relative to 1 g of the total mass of the raw material inclusion needs to be 0.1 mL or more and 4.0 mL or less. From the viewpoint of efficiently attaining the use effect of the complexing agent of forming an electrolyte precursor as a result of more effective dispersion and fixation of a halogen atom to give a solid electrolyte having a high ionic conductivity, the amount is preferably 0.3 mL or more and 3.8 mL or less, more preferably 0.5 mL or more and 3.7 mL or less, even more preferably 0.8 mL or more and 3.5 mL or less, further more preferably 1.5 mL or more and 3.5 mL or less.

The boiling point of the complexing agent is, from the viewpoint of operability in mixing, preferably 80° C. or higher, more preferably 100° C. or higher, even more preferably 110° C. or higher, and is, from the viewpoint of suppressing dissolution of a lithium halide from an electrolyte precursor to give a solid electrolyte having a high ionic conductivity, preferably 180° C. or lower, more preferably 150° C. or lower, even more preferably 130° C. or lower.

(Solvent)

The present embodiment needs to use a solvent along with the raw material inclusion and the complexing agent. In view of the fact that the raw material inclusion and the complexing agent are mixed using a solvent, an effect to be brought by using the complexing agent, namely an effect in which formation of the electrolyte precursor acting with a lithium atom, a sulfur atom, a phosphorus atom, and a halogen atom is promoted, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which a halogen atom is more likely dispersed and fixed is obtained, as a result, an effect for obtaining a high ionic conductivity is easily exhibited.

The present embodiment is a so-called heterogeneous method, and it is preferred that the electrolyte precursor is not completely dissolved in the solvent and in the complexing agent that is a liquid but deposited. In the present embodiment, by adding the solvent, the solubility of the electrolyte precursor can be adjusted. In particular, a halogen atom is liable to be dissolved out from the electrolyte precursor to the complexing agent that is a liquid, and therefore, by adding the solvent, the dissolution of a halogen atom is suppressed, whereby the desired electrolyte precursor is obtained. As a result, a crystalline solid electrolyte having a high ionic conductivity can be obtained via the electrolyte precursor in which the components, such as a halogen, are dispersed.

Also preferably, the solvent is added to the slurry of an electrolyte precursor after mixing.

Regarding the solvent, as mentioned above, the solubility of a lithium halide at 25° C. in the solvent is preferably smaller than the solubility of a lithium halide at 25° C. in the complexing agent. From the viewpoint of suppressing dissolution of a lithium halide from an electrolyte precursor to facilitate production of a solid electrolyte having a high ionic conductivity, the solubility is preferably less than 0.5 g/100 mL, more preferably 0.3 g/100 mL or less, even more preferably less than 0.1 g/100 mL. The lower limit is not specifically defined, but preferably a lithium halide does not substantially dissolve in the solvent.

The solubility of a lithium halide (g/100 mL) means a mass of a lithium halide relative to 100 mL of the solvent at 25° C. In the case of using plural lithium halides, the solubility is defined as the solubility of the lithium halide that has a highest solubility among the plural lithium halides in the complexing agent as combined with the solvent.

The boiling point of the solvent is, from the viewpoint of operability in mixing, preferably 80° C. or higher, more preferably 100° C. or higher, even more preferably 120° C. or higher. From the viewpoint of suppressing dissolution of a lithium halide from an electrolyte precursor to give a solid electrolyte having a high ionic conductivity, the boiling point is preferably 180° C. or lower, more preferably 150° C. or lower, even more preferably 140° C. or lower.

The amount of the solvent to be used relative to 1 g of the total mass of the raw material inclusion is, from the viewpoint of providing a solid electrolyte having a high ionic conductivity, preferably 0.1 to 50 mL, more preferably 1.0 to 40 mL, even more preferably 5.0 to 30 mL.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value $\delta$ ($(cal/cm^3)^{1/2}$) calculated according to the following numerical formula (1), which is also called a Hildebrand parameter, SP value.

$$\delta = \sqrt{(\Delta H - RT)/V} \tag{1}$$

In the numerical formula (1), $\Delta H$ is a molar heating value; R is a gas constant; T is a temperature; and V is molar volume.

By using the solvent having a solubility parameter of 10 or less, the solvent has such properties that as compared by the aforementioned complexing agent, it relatively hardly dissolves the halogen atom, the raw materials containing a halogen atom, such as a lithium halide, and further the halogen atom-containing component constituting the complex crystal contained in the electrolyte precursor (for example, an aggregate in which lithium halide and the complexing agent are bound with each other). Accordingly, it becomes easy to fix the halogen atom within the electrolyte precursor; the halogen atom is existent in a favorable state in the resulting electrolyte precursor and further the solid electrolyte. As a result, a solid electrolyte having a high ionic conductivity is readily obtained. That is, it is preferred that the solvent which is used in the present embodiment has such properties that it does not dissolve or hardly dissolves the electrolyte precursor. From the same viewpoint, the solubility parameter of the solvent is preferably 9.5 or less, more preferably 9.0 or less, and still more preferably 8.5 or less.

More specifically, as the solvent which is used in the present embodiment, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol solvent, an ester solvent, an aldehyde solvent, a ketone solvent, an ether solvent, and a solvent containing a carbon atom and a hetero atom. From these, appropriate solvents can be selected and used in consideration of the solubility of a lithium halide at 25° C. therein, and also the boiling point and the solubility parameter thereof. Hydrocarbon solvents are preferred, and those containing one or more selected from an aliphatic hydrocarbon solvent, an alicyclic hydrocarbon solvent and an aromatic hydrocarbon solvent are more preferred.

More specifically, the solvent includes aliphatic hydrocarbon solvents such as hexane, pentane, 2-ethylhexane, heptane, octane, decane, undecane, dodecane, tridecane, and paraffinic solvents (e.g., IP Solvent by Idemitsu Kosan Co., Ltd.); alicyclic hydrocarbon solvents such as cyclohexane, methylcyclohexane, ethylcyclohexane, and dimethylcyclohexane; aromatic hydrocarbon solvents such as benzene, toluene, xylene, mesitylene, ethylbenzene, tert-butylbenzene, trifluoromethylbenzene, nitrobenzene, chlorobenzene, chlorotoluene, and bromotoluene; alcohol solvents such as ethanol, and butanol; ester solvents such as ethyl acetate, and butyl acetate; aldehyde solvents such as formaldehyde, acetaldehyde, and dimethylformamide; ketone solvents such as acetone, methyl ethyl ketone, and cyclohexanone; ether solvents such as diethyl ether, diisopropyl ether, dibutyl ether, tetrahydrofuran, dimethoxyethane, cyclopentyl methyl ether, tert-butyl methyl ether, and anisole; and solvents containing a carbon atom and a hetero atom such as acetonitrile, dimethyl sulfoxide, and carbon disulfide.

Among these, from the viewpoint of attaining a high ionic conductivity, aliphatic hydrocarbon solvents, alicyclic hydrocarbon solvents, aromatic hydrocarbon solvents and ether solvents are preferred, heptane, cyclohexane, methylcyclohexane, ethylcyclohexane, dimethylcyclohexane, toluene and ethylbenzene are more preferred, heptane, cyclohexane, methylcyclohexane, ethylcyclohexane, diethyl ether, diisopropyl ether, and dibutyl ether are even more preferred, and ethylcyclohexane is further more preferred. The solvent for use in the present embodiment is preferably an organic solvent as mentioned above, and an organic solvent that differs from the above-mentioned complexing agent. In the present embodiment, these solvents can be used singly, or plural kinds thereof can be used as combined.

In the case of using the solvent, the content of the raw materials in the raw material inclusion may be regulated to one relative to one liter of the total amount of the complexing agent and the solvent.

(Relationship Between Complexing Agent and Solvent)

Regarding the solubility of a lithium halide at 25° C. in the complexing agent and that in the solvent in the present embodiment, preferably, the solubility of a lithium halide at 25° C. in the solvent is smaller than the solubility of a lithium halide at 25° C. in the complexing agent.

The complex crystal to be mentioned below contains an $Li_3PS_4$ complex formed of $Li_3PS_4$ and a complexing agent, and an LiX complex formed of a lithium halide and a complexing agent (in the formula, X represents a halogen atom, and the halogen atom is preferably a chlorine atom, a bromine atom or an iodine atom). In the present embodiment, a solvent having a low solubility of a lithium halide is used, and therefore the lithium halide complex containing a halogen atom can be prevented from separating from the complex crystal and a halogen atom can be therefore kept staying in the complex crystal, and accordingly, it is considered that a solid electrolyte having a high ionic conductivity can be obtained.

The complexing agent does not dissolve an electrolyte complex such as an $Li_3PS_4$ complex but tends to dissolve an LiX complex, and therefore an LiX complex may dissolve out in the liquid part of a slurry that contains the complexing agent, from an electrolyte precursor so that the LiX complex may separate from the complex crystal. When this is dried in a later step to be mentioned hereinunder, the dissolved LiX complex may again precipitate out so that the halogen atom dispersion will be non-uniform in the electrolyte precursor, and it is considered that the crystalline solid electrolyte of the final product could no more have a desired crystal structure.

For example, in Examples to be given hereinunder, cyclohexane, heptane and ethylcyclohexane are used as the solvent for the complexing agent of tetramethylethylenediamine. The solubility of lithium bromide in these solvents is less than 0.1 mg/100 mL each.

In the case where the present embodiment includes drying to be mentioned below, it is also preferable to select the complexing agent and the solvent depending on the relationship of the boiling point between them, and more preferably, the boiling point of the solvent contained in the slurry of an electrolyte precursor that contains a complex crystal is higher than the boiling point of the complexing agent.

In the case where the present embodiment includes drying to be mentioned below, the boiling point of the complexing agent contained in the slurry of an electrolyte precursor is preferably lower than the boiling point of the solvent in the case, since the complexing agent can be removed prior to the solvent when the drying is carried out under reduced pressure or by heating, or by a combination thereof. Contrary to this, when the solvent is removed earlier, then the concentration of the complexing agent in the slurry of an electrolyte precursor may increase so that dissolution of the LiX complex from the electrolyte precursor may be promoted. Consequently, it is preferable that the complexing agent is removed earlier for suppressing the dispersion of the halogen atom in the solid electrolyte precursor from becoming uneven to give a solid electrolyte having a high ionic conductivity.

The solvent having a higher boiling point than the complexing agent can also be used as a solvent in mixing the raw material inclusion that contains a lithium atom, a sulfur atom, a phosphorus atom and a halogen atom, with a complexing agent and a solvent, however, the relationship of the boiling point between the solvent and the complexing agent is important in drying, and therefore in the case where the present embodiment includes removing the liquid component from the complexing agent as will be mentioned hereinunder, it is also preferable to add a solvent having a higher boiling point than the complexing agent before drying.

After the solubility of the electrolyte precursor in the solvent and that in the complexing agent are controlled in the manner as above and when a slurry of the electrolyte precursor is made to contain a solvent having a higher boiling point than the complexing agent, dispersion of the halogen atom in the solid electrolyte precursor can be favorably prevented from becoming non-uniform and a solid electrolyte having a high ionic conductivity can be therefore obtained.

For example, in Examples to be given hereinunder, tetramethylethylenediamine having a boiling point of 121° C. is used as a complexing agent. In this case, a solvent having a higher boiling point than the complexing agent includes octane, decane, undecane, dodecane, tridecane, IP Solvent, ethylcyclohexane, dimethylcyclohexane, xylene, mesitylene, ethylbenzene, tert-butylbenzene, nitrobenzene, chlorobenzene, chlorotoluene, bromobenzene, butyl acetate, dimethylformamide, dibutyl ether, anisole, cyclohexane, and dimethyl sulfoxide. From the viewpoint of suppressing the solvent from remaining in the solid electrolyte, use of octane, decane, IP Solvent, ethylcyclohexane, dimethylcyclohexane, xylene, mesitylene, ethylbenzene, tert-butylbenzene, chlorobenzene, chlorotoluene, bromobenzene, butyl acetate, dimethylformamide, dibutyl ether, anisole and cyclohexane is preferred among these.

The slurry of an electrolyte precursor that contains the above-mentioned complexing agent, solvent and complex crystal may contain one kind or two or more kinds of solvent species, and in the case where the slurry contains plural solvent species, preferably, the boiling point of at least one solvent species is higher than the boiling point of all the complexing agents contained in the slurry. In such a case, dispersion of a halogen atom in the solid electrolyte precursor can be suppressed from becoming non-uniform and a solid electrolyte having a high ionic conductivity can be favorably obtained.

When the above-mentioned relationship is satisfied, the liquid component of the complexing agent can be removed from the slurry of an electrolyte precursor that contains a complex crystal and therefore a slurry containing a solvent and an electrolyte precursor can be obtained, and in such a case, dispersion of a halogen atom in the solid electrolyte precursor can be suppressed from becoming non-uniform and a solid electrolyte having a high ionic conductivity can be favorably obtained.

(Mixing)

As shown in the flow chart of FIG. 1, the raw material inclusion, the complexing agent and the solvent need to be mixed. In the present embodiment, though a mode of mixing the raw material inclusion, the complexing agent and the solvent may be in any of a solid state and a liquid state, in general, the raw material inclusion contains a solid, whereas the complexing agent and the solvent are in a liquid state, and therefore, in general, mixing is made in a mode (slurry) in which the solid raw material inclusion is existent in the liquid complexing agent.

The content of the raw material inclusion is preferably 5 g or more, more preferably 10 g or more, still more preferably 30 g or more, and yet still more preferably 50 g or more relative to the total amount of one liter of the complexing agent and the solvent, and an upper limit thereof is preferably 500 g or less, more preferably 400 g or less, still more preferably 300 g or less, and yet still more preferably 250 g of less. When the content of the raw material inclusion falls within the aforementioned range, the raw material inclusion is readily mixed, the dispersing state of the raw materials is enhanced, and the reaction among the raw materials is promoted, and therefore, the electrolyte precursor and further the solid electrolyte are readily efficiently obtained.

A method for mixing the raw material inclusion, the complexing agent and the solvent is not particularly restricted, and the raw material inclusion, the complexing agent and the solvent may be charged in an apparatus capable of mixing the raw material inclusion, the complexing agent and the solvent, and mixed. For example, feeding the raw material inclusion into a tank followed by adding the complexing agent and the solvent thereto is preferred from the viewpoint of operation efficiency since liquid splashing that may be caused by solid addition can be prevented.

In the case of using a halogen simple substance as the raw material, there is a case where the raw material is not a solid. Specifically, fluorine and chlorine are a gas, and bromine is a liquid under normal temperature and normal pressure. For example, in the case where the raw material is a liquid, it may be fed into the tank separately from the other raw materials together with the complexing agent and the solvent, and in the case where the raw material is a gas, the gaseous raw material may be fed such that it is blown into the complexing agent, the solvent and other solid raw materials.

The present embodiment is characterized by including mixing the raw material inclusion, the complexing agent and the solvent, and the electrolyte precursor can also be produced by a method not using an instrument to be used for the purpose of pulverization of solid raw materials, which is generally called a pulverizer, such as a medium type pulverizer, e.g., a ball mill and a bead mill. According to the present embodiment, by merely mixing the raw material inclusion, the complexing agent and the solvent, the raw materials and the complexing agent contained in the inclusion are mixed, whereby the electrolyte precursor can be formed. In view of the fact that a mixing time for obtaining the electrolyte precursor can be shortened, or atomization can be performed, the mixture of the raw material inclusion, the complexing agent and the solvent may be pulverized by a pulverizer.

Examples of an apparatus for mixing the raw material inclusion, the complexing agent and the solvent include a mechanical agitation type mixer having an impeller provided in a tank. Examples of the mechanical agitation type mixer include a high-speed agitation type mixer and a double arm type mixer, and a high-speed agitation type mixer is preferably used from the viewpoint of increasing the homogeneity of raw materials in the mixture of the raw material inclusion and the complexing agent and obtaining a higher ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, a C type blade type, an anchor type, a paddle type, and full zone type. From the viewpoint of increasing the homogeneity of raw materials in the raw material inclusion and obtaining a higher ionic conductivity, a shovel type, a flat blade type, a C type blade type, and the like are preferred.

For small-quantity production, stirring with a stirrer may be employed.

A temperature condition on the occasion of mixing the raw material inclusion, the complexing agent and the solvent is not particularly limited, and for example, it is −30 to 100° C., preferably −10 to 50° C., and more preferably around room temperature (23° C.) (for example, (room temperature) ±about 5° C.). In addition, a mixing time is about 0.1 to 150 hours, and from the viewpoint of more uniformly mixing the raw material inclusion and the complexing agent and obtaining a higher ionic conductivity, the mixing time is preferably 1 to 120 hours, more preferably 4 to 100 hours, and still more preferably 8 to 80 hours.

By mixing the raw material inclusion, the complexing agent and the solvent, owing to an action of the lithium atom, the sulfur atom, the phosphorus atom, and the halogen atom, all of which are contained in the raw materials, with the complexing agent, an electrolyte precursor in which these atoms are bound directly with each other via and/or not via the complexing agent is obtained. That is, in the present embodiment, the electrolyte precursor obtained through mixing of the raw material inclusion and the complexing agent is constituted of the complexing agent, the lithium atom, the sulfur atom, the phosphorus atom, and the halogen atom, and by mixing the raw material inclusion and the complexing agent, a material containing the electrolyte precursor (hereinafter sometimes referred to as "electrolyte precursor inclusion") is obtained. In the present embodiment, the resulting electrolyte precursor is not one completely dissolved in the complexing agent that is a liquid, and typically, a suspension containing the electrolyte precursor that is a solid is obtained. In consequence, the present embodiment is corresponding to a heterogeneous system in a so-called liquid-phase method.

(Pulverization)

It is preferred that the present embodiment further includes pulverization of the electrolyte precursor. By pulverizing the electrolyte precursor, a solid electrolyte having a small particle diameter is obtained while suppressing the lowering of the ionic conductivity.

The pulverization of the electrolyte precursor in the present embodiment is different from mechanical milling that is a so-called solid-phase method and is not one for obtaining an amorphous or crystalline solid electrolyte owing to a mechanical stress. As mentioned above, the electrolyte precursor contains the complexing agent, and the lithium-containing structure, such as a $PS_4$ structure, and the raw materials containing lithium, such as a lithium halide, are bound (coordinated) with each other via the complexing agent. Then, it may be considered that when the electrolyte precursor is pulverized, fine particles of the electrolyte precursor are obtained while maintaining the aforementioned binding (coordination) and dispersing state. By subjecting this electrolyte precursor to heat treatment, the components bound (coordinated) via the complexing agent are linked with each other at the same time of removal of the complexing agent, and the reaction with the crystalline sulfide solid electrolyte easily takes place. For that reason, growth of large particles owing to aggregation of particles with each other as seen in usual synthesis of a solid electrolyte is hardly generated, and atomization can be readily achieved.

From the viewpoint of performance and production, etc. of an all-solid-battery, it is desired that the particle diameter of the solid electrolyte is small; however, it is not easy to atomize the solid electrolyte through pulverization with a bead mill or the like. It is possible to perform the atomization through wet pulverization using a solvent to some extent; however, the solid electrolyte is liable to be degraded with the solvent, and aggregation is liable to take place during pulverization, resulting in a problem such that an excessive load is applied for the pulverization. On the other hand, even by performing dry pulverization without using a solvent, it is difficult to achieve the atomization in a sub-micron order. Under such circumstances, the fact that the performance of the all-solid-battery can be enhanced, and the production efficiency can be enhanced through easy treatment of performing pulverization of the electrolyte precursor is a significant advantage.

Furthermore, since owing to agitation and mixing following the pulverization, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen atom is more likely dispersed and fixed is obtained, as a result, the effect for obtaining a high ionic conductivity is readily exhibited along with the atomization.

The pulverizer which is used for pulverization of the electrolyte precursor is not particularly restricted so long as it is able to pulverize the particles, and for example, a medium type pulverizer using a pulverization medium can be used. Among medium type pulverizers, taking into account the fact that the electrolyte precursor is in a liquid state or slurry state mainly accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

The electrolyte precursor to be pulverized by the pulverizer is typically fed as the electrolyte precursor inclusion which is obtained by mixing the raw material inclusion and the complexing agent and mainly fed in a liquid state or slurry state. That is, an object to be pulverized by the pulverizer mainly becomes an electrolyte precursor inclusion liquid or an electrolyte precursor slurry. Accordingly, the pulverizer which is used in the present embodiment is preferably a flow type pulverizer capable of being optionally subjected to circulation driving of the electrolyte precursor inclusion liquid or electrolyte precursor slurry. More specifically, it is preferred to use a pulverizer of a mode of circulating the electrolyte precursor inclusion liquid or electrolyte precursor-containing slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount and the like, and for example, it may be about 0.05 mmφ or more and 5.0 mmφ or less, and it is preferably 0.1 mmφ or more and 3.0 mmφ or less, and more preferably 0.3 mmφ or more and 1.5 mmφ or less in terms of a diameter of the bead.

As the pulverizer which is used for pulverization of the electrolyte precursor, a machine capable of pulverizing an object using ultrasonic waves, for example, a machine called an ultrasonic pulverizer, an ultrasonic homogenizer, a probe ultrasonic pulverizer, or the like, can be used.

In this case, various conditions, such as a frequency of ultrasonic waves, may be appropriately selected according to the desired average particle diameter of the electrolyte precursor, and the like. The frequency may be, for example, about 1 kHz or more and 100 kHz or less, and from the viewpoint of more efficiently pulverizing the electrolyte precursor, it is preferably 3 kHz or more and 50 kHz or less, more preferably 5 kHz or more and 40 kHz or less, and still more preferably 10 kHz or more and 30 kHz or less.

An output which the ultrasonic pulverizer has may be typically about 500 to 16,000 W, and it is preferably 600 to 10,000 W, more preferably 750 to 5,000 W, and still more preferably 900 to 1,500 W.

Although an average particle diameter ($D_{50}$) of the electrolyte precursor which is obtained through pulverization is appropriately determined according to the desire, it is typically 0.01 μm or more and 50 μm or less, preferably 0.03 μm or more and 5 μm or less, more preferably 0.05 μm or more and 3 μm or less. By taking such an average particle diameter, it becomes possible to cope with the desire of the solid electrolyte having a small particle diameter as 1 μm or less in terms of an average particle diameter.

A time for pulverization is not particularly restricted so long as it is a time such that the electrolyte precursor has the desired average particle diameter, and it is typically 0.1 hours or more and 100 hours or less. From the viewpoint of efficiently regulating the particle diameter to the desired size, the time for pulverization is preferably 0.3 hours or more and 72 hours or less, more preferably 0.5 hours or more and 48 hours or less, and still more preferably 1 hour or more and 24 hours or less.

The pulverization may be performed after drying the electrolyte precursor, such as the electrolyte precursor inclusion or electrolyte precursor slurry, to form the electrolyte precursor as a powder.

In this case, among the aforementioned pulverizers as exemplified as the pulverizer which may be used in the present production method, any one of the dry-type pulverizers is preferably used. Besides, the items regarding the pulverization, such as a pulverization condition, are the same as those in the pulverization of the electrolyte precursor inclusion or electrolyte precursor slurry, and the average particle diameter of the electrolyte precursor obtained through pulverization is also the same as that as mentioned above.

(Removal)

In the present embodiment, preferably, the liquid component of the complexing agent and, as needed, the solvent are removed from the electrolyte precursor slurry that contains the complex crystal, after mixing. Accordingly, it is preferable that the liquid component of the complexing agent is removed to give a slurry of the solvent and the electrolyte precursor.

Removal may include drying the electrolyte precursor slurry. Accordingly, an electrolyte precursor powder can be obtained. By previously drying, heating can be attained efficiently. Drying and the subsequent heating can be carried out in one step.

The liquid component of the complexing agent is not taken in the electrolyte precursor, meaning that the complexing agent exists in the liquid part of the electrolyte precursor slurry.

The electrolyte precursor inclusion can be dried at a temperature according to the kind of the solvent and that of the remaining complexing agent (complexing agent not incorporated into the electrolyte precursor). For example, the drying can be performed at a temperature of a boiling point of the complexing agent or higher. In addition, the drying can be performed through drying under reduced pressure (vacuum drying) by using a vacuum pump or the like at typically 5 to 120° C., preferably 10 to 100° C., more preferably 15 to 90° C., and still more preferably around room temperature (23° C.) (for example, (room temperature) ±about 5° C.), to volatilize the complexing agent.

The drying may be performed by subjecting the electrolyte precursor inclusion to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the electrolyte precursor inclusion is transferred into a container, and after the electrolyte precursor is precipitated, the complexing agent and the solvent as a supernatant are removed, or filtration with a glass filter having a pore size of, for example, about 10 to 200 μm, and preferably 20 to 150 μm, is easy.

Also preferably, a batch-type drier is used for removing the solvent from the electrolyte precursor slurry that contains a complex crystal, as applicable to mass-scale production.

In drying the electrolyte precursor slurry in the present embodiment, preferably, the solvent is removed after the liquid complexing agent is removed, from the viewpoint of obtaining a solid electrolyte having a high ionic conductivity. Accordingly, it is further desirable that the complexing agent is first removed, and then the solvent is thereafter removed from the complex crystal-containing electrolyte precursor slurry. For this, the boiling point of the solvent contained in the complex crystal-containing electrolyte precursor slurry is preferably higher than the boiling point of the complexing agent.

(Electrolyte Precursor)

Figure 3:
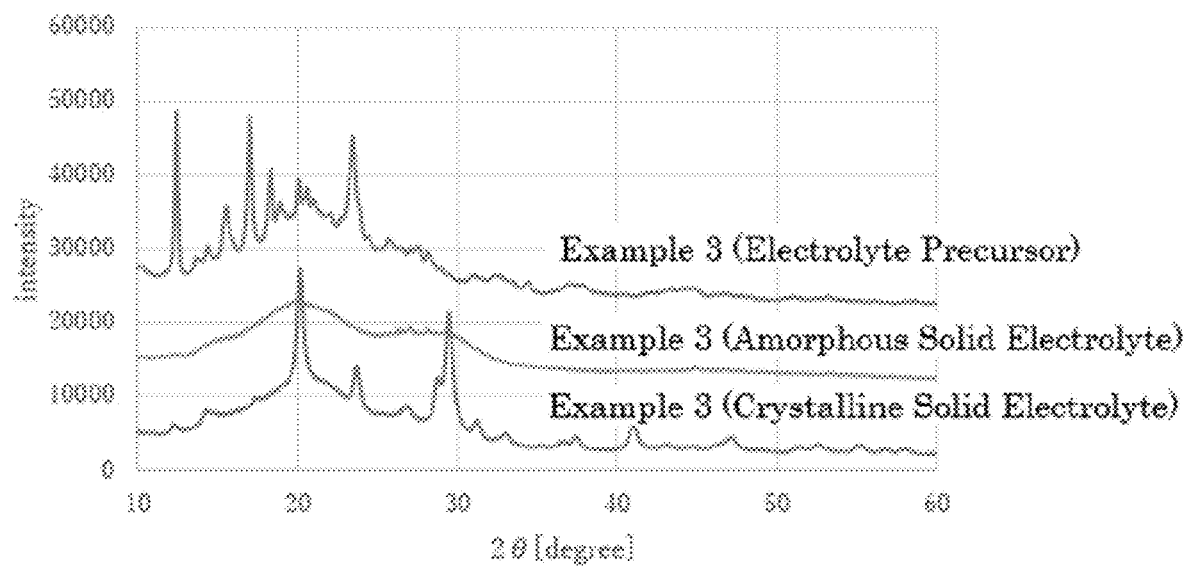
FIG. 3 shows X-ray diffraction spectra of the electrolyte precursor, the amorphous solid electrolyte and the crystalline solid electrolyte obtained in Example 3.
Figure 4:
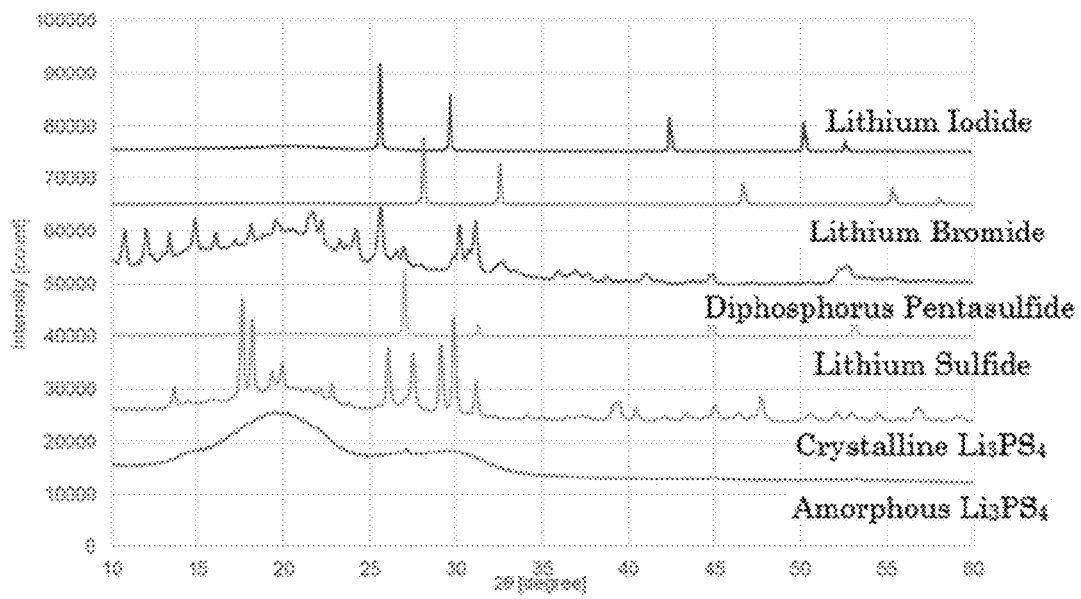
FIG. 4 shows X-ray diffraction spectra of the raw materials used in Examples.

The electrolyte precursor in this embodiment has such a characteristic feature that it is constituted of the complexing agent, the lithium atom, the sulfur atom, the phosphorus atom, and the halogen atom, and in the X-ray diffraction pattern in the X-ray diffractometry, peaks different from the peaks derived from the raw materials are observed. Preferably, the electrolyte precursor contains a complex crystal constituted of the complexing agent, the lithium atom, the sulfur atom, the phosphorus atom, and the halogen atom. When only the raw material inclusion is merely mixed, the peaks derived from the raw materials are merely observed, whereas when the raw material inclusion and the complexing agent are mixed, peaks different from the peaks derived from the raw materials are observed. Thus, the electrolyte precursor (complex crystal) has a structure explicitly different from the raw materials themselves contained in the raw material inclusion. This matter is specifically confirmed in the section of Examples. Measurement examples of the X-ray diffraction patterns of the electrolyte precursor (complex crystal) and the respective raw materials, such as lithium sulfide, are shown in FIGS. 3 and 4, respectively. It is noted from the X-ray diffraction patterns that the electrolyte precursor (complex crystal) has a predetermined crystal structure. In addition, the diffraction pattern of the electrolyte precursor does not contain the diffraction patterns of any raw materials, such as lithium sulfide, as shown in FIG. 4, and thus, it is noted that the electrolyte precursor (complex crystal) has a crystal structure different from the raw materials.

In addition, the electrolyte precursor (complex crystal) has such a characteristic feature that it has a structure different from the crystalline solid electrolyte. This matter is also specifically confirmed in the section of Examples. The X-ray diffraction pattern of the crystalline solid electrolyte is also shown in FIG. 3, and it is noted that the foregoing diffraction pattern is different from the diffraction pattern of the electrolyte precursor (complex crystal). The electrolyte precursor (complex crystal) has the predetermined crystal structure and is also different from the amorphous solid electrolyte having a broad pattern as shown in FIG. 3.

The complex crystal is constituted of the complexing agent, the lithium atom, the sulfur atom, the phosphorus atom, and the halogen atom, and typically, it may be presumed that a complex structure in which the lithium atom and the other atoms are bound directly with each other via and/or not via the complexing agent is formed.

Here, the fact that the complexing agent constitutes the complex crystal can be, for example, confirmed through gas chromatography analysis. Specifically, the complexing agent contained in the complex crystal can be quantitated by dissolving a powder of the electrolyte precursor in methanol and subjecting the obtained methanol solution to gas chromatography analysis.

Although the content of the complexing agent in the electrolyte precursor varies with the molecular weight of the complexing agent, it is typically about 30% by mass or more and 80% by mass or less, and preferably 35% by mass or more and 75% by mass or less.

In the present embodiment, what the complex crystal containing the halogen atom is formed is preferred from the standpoint of enhancing the ionic conductivity. By using the complexing agent, the lithium-containing structure, such as a $PS_4$ structure, and the lithium-containing raw materials, such as a lithium halide, are bound (coordinated) with each other via the complexing agent, the complex crystal in which the halogen atom is more likely dispersed and fixed is readily obtained, and the ionic conductivity is enhanced.

The matter that the halogen atom in the electrolyte precursor constitutes the complex crystal can be confirmed from the fact that even when the solid-liquid separation of the electrolyte precursor inclusion is performed, the predetermined amount of the halogen atom is contained in the electrolyte precursor. This is because the halogen atom which does not constitute the complex crystal is easily eluted as compared with the halogen atom constituting the complex crystal and discharged into the liquid of solid-liquid separation. In addition, the foregoing matter can also be confirmed from the fact that by performing composition analysis through ICP analysis (inductively coupled plasma atomic emission spectrophotometry) of the electrolyte precursor or solid electrolyte, a proportion of the halogen atom in the electrolyte precursor or solid electrolyte is not remarkably lowered as compared with a proportion of the halogen atom fed from the raw materials.

The amount of the halogen atom remaining in the electrolyte precursor is preferably 30% by mass or more, more preferably 35% by mass or more, and still more preferably 40% by mass or more relative to the charged composition. An upper limit of the halogen atom remaining in the electrolyte precursor is 100% by mass.

(Heating)

It is preferred that the present embodiment includes heating of the electrolyte precursor to give the amorphous solid electrolyte; and heating of the electrolyte precursor or amorphous solid electrolyte to give the crystalline solid electrolyte.

In view of the fact that heating of the electrolyte precursor is included, the complexing agent in the electrolyte precursor is removed, and the amorphous solid electrolyte and the crystalline solid electrolyte each containing the lithium atom, the sulfur atom, the phosphorus atom, and the halogen atom are obtained. In addition, the electrolyte precursor to be heated by the present heating may be an electrolyte precursor pulverized product which has been pulverized through the aforementioned pulverization.

Here, the fact that the complexing agent in the electrolyte precursor is removed is supported by the facts that in addition to the fact that it is evident from the results of the X-ray diffraction pattern, the gas chromatography analysis, and the like that the complexing agent constitutes the complex crystal of the electrolyte precursor, the solid electrolyte obtained by removing the complexing agent through heating of the electrolyte precursor is identical in the X-ray diffraction pattern with the solid electrolyte obtained by the conventional method without using the complexing agent.

In the production method of the present embodiment, the solid electrolyte is obtained by heating the electrolyte precursor to remove the complexing agent in the electrolyte precursor, and it is preferred that the content of the complexing agent in the solid electrolyte is low as far as possible. However, the complexing agent may be contained to an extent that the performance of the solid electrolyte is not impaired. The content of the complexing agent in the solid electrolyte may be typically 10% by mass or less, and it is preferably 5% by mass or less, more preferably 3% by mass or less, and still more preferably 1% by mass or less.

In the production method of the present embodiment, in order to obtain the crystalline solid electrolyte, it may be obtained by heating the electrolyte precursor, or it may be obtained by heating the electrolyte precursor to obtain the amorphous solid electrolyte and then heating the amorphous solid electrolyte. That is, in the production method of the present embodiment, the amorphous solid electrolyte can also be produced.

Conventionally, in order to obtain a crystalline solid electrolyte having a high ionic conductivity, for example, a solid electrolyte having a thio-LISICON Region II-type crystal structure as mentioned later, it was required that an amorphous solid electrolyte is prepared through mechanical pulverization treatment, such as mechanical milling, or other melt quenching treatment or the like, and then, the amorphous solid electrolyte is heated. But, it may be said that the production method of the present embodiment is superior to the conventional production method by mechanical milling treatment or the like from the standpoint that a crystalline solid electrolyte having a thio-LISICON Region II-type crystal structure is obtained even by a method of not performing mechanical pulverization treatment, other melt quenching treatment, or the like.

In the present embodiment, whether or not the amorphous solid electrolyte is obtained, whether or not the crystalline solid electrolyte is obtained, whether or not after obtaining the amorphous solid electrolyte, the crystalline solid electrolyte is obtained, or whether or not the crystalline solid electrolyte is obtained directly from the electrolyte precursor is appropriately selected according to the desire, and is able to be adjusted by the heating temperature, the heating time, or the like.

For example, in the case of obtaining the amorphous solid electrolyte, the heating temperature of the electrolyte precursor may be determined according to the structure of the crystalline solid electrolyte which is obtained by heating the amorphous solid electrolyte. Specifically, the heating temperature may be determined by subjecting the amorphous solid electrolyte to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous solid electrolyte is obtained more efficiently and surely. Although the heating temperature for obtaining the amorphous solid electrolyte cannot be unequivocally prescribed because it varies with the structure of the resulting crystalline solid electrolyte, in general, it is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 110° C. or higher.

In the case of obtaining the crystalline solid electrolyte by heating the amorphous solid electrolyte or directly from the electrolyte precursor, the heating temperature may be determined according to the structure of the crystalline solid electrolyte, and it is preferably higher than the aforementioned heating temperature for obtaining the amorphous solid electrolyte. Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline solid electrolyte is obtained more efficiently and surely. Although the heating temperature for obtaining the crystalline solid electrolyte cannot be unequivocally prescribed because it varies with the structure of the resulting crystalline solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous solid electrolyte or crystalline solid electrolyte is obtained, for example, it is preferably 1 minute or more, more preferably 10 minutes or more, still more preferably 30 minutes or more, and yet still more preferably 1 hour or more. In addition, though an upper limit of the heating temperature is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuum). This is because deterioration (for example, oxidation) of the crystalline solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

(Amorphous Solid Electrolyte)

The amorphous solid electrolyte which is obtained in the present embodiment contains the lithium atom, the sulfur atom, the phosphorus atom, and the halogen atom. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other atom, such as an oxygen atom and a silicon atom, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the atoms constituting the amorphous solid electrolyte can be confirmed by, for example, an inductivity coupled plasma optical emission spectrometer (ICP).

In the case where the amorphous solid electrolyte obtained in the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous solid electrolyte obtained in the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous solid electrolyte obtained in the present embodiment, a blending ratio (molar ratio) of lithium atom to sulfur atom to phosphorous atom to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen atom, a blending ratio (molar ratio) of lithium atom to sulfur atom to phosphorus atom to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium atom to sulfur atom to phosphorus atom to halogen atom to fall within the aforementioned range, it becomes easy to provide a solid electrolyte having a thio-LISICON Region II-type crystal structure and having a higher ionic conductivity.

Although the shape of the amorphous solid electrolyte is not particularly restricted, examples thereof include a granular shape. The average particle diameter ($D_{50}$) of the granular amorphous solid electrolyte is, for example, within a range of 0.01 to 500 μm, and preferably 0.1 to 200 μm.

(Crystalline Solid Electrolyte)

The crystalline solid electrolyte obtained in the present embodiment may be a so-called glass ceramics which is obtained by heating the amorphous solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of $2\theta=20.2°$ and 23.6° (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725). Among them, the thio-LISICON Region II-type crystal structure is preferred as the crystal structure of the crystalline solid electrolyte obtained in the present embodiment from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline solid electrolyte obtained by the production method of a solid electrolyte of the present embodiment may be one having the aforementioned thio-LISICON Region II-type crystal structure or may be one having the thio-LISICON Region II-type crystal structure as a main crystal, it is preferably one having the thio-LISICON Region II-type crystal structure as a main crystal. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline solid electrolyte obtained by the production method of a solid electrolyte of the present embodiment is preferably one not containing crystalline $Li_3PS_4$ ($\beta$-$Li_3PS_4$).

In the X-ray diffractometry using a CuKα ray, the $Li_3PS_4$ crystal structure gives diffraction peaks, for example, at around 2θ=17.5°, 18.3°, 26.1°, 27.3°, and 30.0°; the $Li_4P_2S_6$ crystal structure gives diffraction peaks, for example, at around 2θ=16.9°, 27.1°, and 32.5°; the $Li_7PS_6$ crystal structure gives diffraction peaks, for example, at around 2θ=15.3°, 25.2°, 29.6°, and 31.0°; the $Li_7P_3S_{11}$ crystal structure gives diffraction peaks, for example, at around 2θ=17.8°, 18.5°, 19.7°, 21.8°, 23.7°, 25.9°, 29.6°, and 30.0°; the $Li_{4-x}Ge_{1-x}P_xS_4$-based thio-LISICON Region II-type crystal structure gives diffraction peaks, for example, at around 2θ=20.1°, 23.9°, and 29.5°; and the crystal structure similar to the $Li_{4-x}Ge_{1-x}P_xS_4$-based thio-LISICON Region II-type crystal structure gives diffraction peaks, for example, at around 2θ=20.2° and 23.6°. The position of these peaks may vary within a range of ±0.5°.

As mentioned above, in the case where the thio-LISICON Region II-type crystal structure is obtained in the present embodiment, the foregoing crystal structure is preferably one not containing crystalline $Li_3PS_4$ ($\beta$-$Li_3PS_4$). FIG. 3 shows an X-ray diffractometry example of the crystalline solid electrolyte obtained by the production method of the present embodiment. In addition, FIG. 4 shows an X-ray diffractometry example of crystalline $Li_3PS_4$ ($\beta$-$Li_3PS_4$). As grasped from FIGS. 3 and 4, the solid electrolyte of the present embodiment does not have diffraction peaks at 2θ=17.5° and 26.1°, or even in the case where it has diffraction patterns, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the aforementioned compositional formula $Li_{7-x-2y}PS_{6-x-y}Cl_x$ (0.8≤x≤1.7, and 0<y≤(−0.25 x+0.5)) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the aforementioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

Although the shape of the crystalline solid electrolyte is not particularly restricted, examples thereof include a granular shape. The average particle diameter ($D_{50}$) of the granular amorphous solid electrolyte is, for example, within a range of 0.01 to 500 μm, and preferably 0.1 to 200 μm.

The solid electrolyte obtained in the present embodiment has a high ionic conductivity and also has an excellent battery performance, and hardly generates hydrogen sulfide, so that it is suitably used for batteries. In the case of adopting a lithium atom as the conduction species, such is especially suitable. The solid electrolyte of the present embodiment may be used for a positive electrode layer, may be used for a negative electrode layer, or may be used for an electrolyte layer. Each of the layers can be produced by a known method.

(Positive Electrode Mixture and Negative Electrode Mixture)

For example, in the case of using the solid electrolyte for the positive electrode layer or the negative electrode layer, by dispersing a positive electrode active material or a negative electrode active material in an electrolyte precursor slurry, which is the electrolyte precursor inclusion, mixing them, and drying, the electrolyte precursor is attached onto the active material surface. Furthermore, similar to the aforementioned embodiment, by heating the electrolyte precursor, it becomes an amorphous solid electrolyte or crystalline solid electrolyte. At this time, by heating together with the active material, the positive electrode mixture or negative electrode mixture having the solid electrolyte attached onto the active material surface is obtained.

As the positive electrode active material, any material can be used without particular restrictions so far as it may promote a battery chemical reaction accompanied by transfer of a lithium ion caused due to the lithium atom to be preferably adopted as an atom capable of revealing the ionic conductivity in the present embodiment in relation to the negative electrode active material. Examples of such a positive electrode active material in and from which a lithium ion can be inserted and released include an oxide-based positive electrode active material and a sulfide-based positive electrode active material.

Preferably, examples of the oxide-based positive electrode active material include lithium-containing transition metal complex oxides, such as LMO (lithium manganate), LCO (lithium cobaltate), NMC (lithium nickel manganese cobaltate), NCA (lithium nickel cobalt aluminate), LNCO (lithium nickel cobaltate), and an olivine type compound ($LiMeNPO_4$: Me=Fe, Co, Ni, or Mn).

Examples of the sulfide-based positive electrode active material include titanium sulfide ($TiS_2$), molybdenum sulfide ($MoS_2$), iron sulfide (FeS and $FeS_2$), copper sulfide (CuS), and nickel sulfide ($Ni_3S_2$).

Besides the aforementioned positive electrode active materials, niobium selenide ($NbSe_3$) and so on can also be used.

In the present embodiment, the positive electrode active material can be used alone or in combination of plural kinds thereof.

As the negative electrode active material, any material can be used without particular restrictions so long as it may promote a battery chemical reaction accompanied by transfer of a lithium ion caused preferably due to the lithium atom, such as an atom which is preferably adopted as an atom revealing the ionic conductivity in the present embodiment, and preferably a metal capable of forming an alloy together with the lithium atom, an oxide thereof, and an alloy of the foregoing metal and the lithium atom. As such a negative electrode active material in and from which a lithium ion can be inserted and released, any material which is known as the negative electrode material in the battery field can be adopted without restrictions.

Examples of such a negative active material include metallic lithium or a metal capable of forming an alloy together with metallic lithium, such as metallic lithium, metallic indium, metallic aluminum, metallic silicon, and metallic tin; an oxide of such a metal; and an alloy of such a metal and metallic lithium.

The electrode active material which is used in the present embodiment may also be one having a coating layer whose surface is coated.

Examples of the material which forms the coating layer include ionic conductors, such as nitrides or oxides of an atom revealing the ionic conductivity in the crystalline sulfide solid electrolyte to be used in the present embodiment, preferably a lithium atom, or complexes thereof. Specifically, examples thereof include lithium nitride ($Li_3N$); a conductor having a silicon type crystal structure composed of, as a main structure, $Li_4GeO_4$, for example, $Li_{4-2x}Zn_xGeO_4$; a conductor having an $Li_3PO_4$ type skeleton structure, for example, a thio-lisicon type crystal structure, such as $Li_{4-x}Ge_{1-x}P_xS_4$; a conductor having a perovskite type crystal structure, such as $La_{2/3-x}Li_{3x}TiO_3$; and a conductor having an NASICON type crystal structure, such as $LiTi_2(PO_4)_3$.

In addition, examples thereof include lithium titanates, such as $Li_yTi_{3-y}O_4$ (0<y<3) and $Li_4Ti_5O_{12}$ (LTO); lithium metallates of a metal belonging to the Group 5 of the periodic table, such as $LiNbO_3$ and $LiTaO_3$; and oxide-based conductors, such as $Li_2O$—$B_2O_3$—$P_2O_5$-based, $Li_2O$—$B_2O_3$—ZnO-based, and $Li_2O$—$Al_2O_3$—$SiO_2$—$P_2O_5$—$TiO_2$-based materials.

The electrode active material having a coating layer is, for example, obtained by attaching a solution containing various atoms constituting a material for forming the coating layer onto the surface of the electrode active material and burning the electrode active material after attachment preferably at 200° C. or higher and 400° C. or lower.

Here, as the solution containing various atoms, a solution containing an alkoxide of a metal of every sort, such as lithium ethoxide, titanium isopropoxide, niobium isopropoxide, and tantalum isopropoxide, may be used. In this case, as the solvent, an alcohol-based solvent, such as ethanol and butanol; an aliphatic hydrocarbon solvent, such as hexane, heptane, and octane; an aromatic hydrocarbon solvent, such as benzene, toluene, and xylene; and so on may be used.

The aforementioned attachment may be performed through dipping, spray coating, or the like.

From the viewpoint of enhancing the production efficiency and the battery performance, a burning temperature is preferably 200° C. or higher and 400° C. or lower as mentioned above, and more preferably 250° C. or higher and 390° C. or lower, and a burning time is typically about 1 minute to 10 hours, and preferably 10 minutes to 4 hours.

A coverage of the coating layer on a basis of a surface area of the electrode active material is preferably 90% or more, more preferably 95% or more, and still more preferably 100%, namely it is preferred that the entire surface is coated. In addition, a thickness of the coating layer is preferably 1 nm or more, and more preferably 2 nm or more, and an upper limit thereof is preferably 30 nm or less, and more preferably 25 nm or less.

The thickness of the coating layer can be measured through cross-sectional observation with a transmission electron microscope (TEM), and the coverage can be calculated from the thickness, the atomic analysis value, and the BET surface area of the coating layer.

The aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned solid electrolyte, with Au or the like can be used.

EXAMPLES

Next, the present invention is described specifically with reference to Examples, but it should be construed that the present invention is by no means restricted by these Examples.

Example 1

Into a stirring bar-containing Schlenk flask (capacity: 100 mL), 0.586 g of lithium sulfide, 0.945 g of diphosphorus pentasulfide, 0.185 g of lithium bromide and 0.284 g or lithium iodide were introduced in a nitrogen atmosphere. After rotating the stirring bar, 20 mL of cyclohexane and 4.4 mL of tetramethylethylenediamine (TMEDA) as a complexing agent were added, agitation was continued for 72 hours, and the resultant electrolyte precursor-containing slurry was dried in vacuum (at room temperature: 23° C.) to obtain an electrolyte precursor as a powder. Subsequently, the powder of the electrolyte precursor was heated at 120° C. in vacuum for 2 hours, thereby obtaining an amorphous solid electrolyte. Furthermore, the amorphous solid electrolyte was heated at 200° C. in vacuum for 2 hours, thereby obtaining a crystalline solid electrolyte.

The solubility of lithium bromide in cyclohexane was less than 0.1 mg/100 mL, and the solubility of lithium bromide in TMEDA was 1 g/100 mL or more.

The amount of the complexing agent used is 4.4 mL relative to 1 g of the total mass of the raw material inclusion (lithium sulfide, diphosphorus pentasulfide, lithium bromide and lithium iodide).

Example 2

Into a stirring bar-containing Schlenk flask (capacity: 100 mL), 0.586 g of lithium sulfide, 0.945 g of diphosphorus pentasulfide, 0.185 g of lithium bromide and 0.284 g or lithium iodide were introduced in a nitrogen atmosphere. After rotating the stirring bar, 20 mL of heptane and 4.4 mL of tetramethylethylenediamine (TMEDA) as a complexing agent were added, agitation was continued for 72 hours, and the resultant electrolyte precursor-containing slurry was dried in vacuum (at room temperature: 23° C.) to give an electrolyte precursor as a powder. Subsequently, the powder of the electrolyte precursor was heated at 120° C. in vacuum for 2 hours, thereby giving an amorphous solid electrolyte. Furthermore, the amorphous solid electrolyte was heated at 200° C. in vacuum for 2 hours, thereby giving a crystalline solid electrolyte.

The solubility of lithium bromide in heptane was less than 0.1 mg/100 mL.

The amount of the complexing agent used is 4.4 mL relative to 1 g of the total mass of the raw material inclusion (lithium sulfide, diphosphorus pentasulfide, lithium bromide and lithium iodide).

Example 3

Into a stirring bar-containing Schlenk flask (capacity: 100 mL), 439.5 g of lithium sulfide, 708.6 g of diphosphorus pentasulfide, 138.5 g of lithium bromide and 213.4 g or lithium iodide were introduced in a nitrogen atmosphere. After rotating the stirring bar, 4 L of ethylcyclohexane was added, and a slurry containing lithium sulfide, diphosphorus pentasulfide, lithium bromide and lithium iodide as raw materials and containing ethylcyclohexane as a solvent was obtained.

The resultant slurry was transferred to a 40-liter impeller-provided reactor, 26 L of ethylcyclohexane was further added thereto (the total amount of ethylcyclohexane was 30 L), and 3.4 L of tetramethylethylenediamine (TMEDA) as a complexing agent was added. The stirring impeller was operated to mix the contents by stirring. 8.72 kg of zirconia balls (diameter: 0.5 mmϕ) were put into a cycle-operable bead mill ("Starmill LME4" by Ashizawa Finetech Ltd.), and using this, the mixture was ground and stirred for 1 hour at a pump flow rate of 2 L/min and a peripheral speed of 12 m/s to give an electrolyte precursor-containing slurry.

6 L of the resultant electrolyte precursor-containing slurry (solid content 5.4%) was fed into a batch-type drier having an internal volume of 10 L (FM Mixer FM10, by Nippon Coke & Engineering, Co., Ltd.) in a nitrogen atmosphere. Next, the drier was so controlled as to have a jacket temperature of 80 to 85° C., an internal temperature of 60 to 65° C. and a pressure of 9 to 11 kPa, the slurry was dried therein for 5 hours to give a powdery electrolyte precursor.

Next, the powdery electrolyte precursor was heated in vacuum at 120° C. for 2 hours to give an amorphous solid electrolyte. Further, the amorphous solid electrolyte was heated in vacuum at 200° C. for 2 hours to give a crystalline solid electrolyte.

The solubility of lithium bromide in ethylcyclohexane was less than 0.1 mg/100 mL.

The amount of the complexing agent used is 2.3 mL relative to 1 g of the total mass of the raw material inclusion (lithium sulfide, diphosphorus pentasulfide, lithium bromide and lithium iodide).

Example 4

In a one-liter impeller-provided reactor, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the resultant reaction liquid slurry was charged in a glass filter (pore size: 40 to 100 μm) to give a solid component, and then, the solid component was dried at 90° C., thereby giving 38 g of $Li_3PS_4$ (purity: 90% by mass) as a white powder. The resultant powder was subjected to powder X-ray diffractometry (XRD) with an X-ray diffraction (XRD) apparatus (SmartLab apparatus, manufactured Rigaku Corporation). As a result, the foregoing powder expressed a hallow pattern and confirmed to be amorphous $Li_3PS_4$.

Into a stirring bar-containing Schlenk flask (capacity: 100 mL), 1.70 g of the above-mentioned white powder ($Li_3PS_4$: 1.53 g), 0.19 g of lithium bromide, 0.28 g of lithium iodide, and 15.6 mL of dibutyl ether as a solvent were introduced in a nitrogen atmosphere. After rotating the stirring bar, 6.6 mL of tetramethylethylenediamine (TMEDA) as a complexing agent was added, agitation was continued for 24 hours, and the resultant electrolyte precursor inclusion was dried in vacuum (at room temperature: 23° C.) to give an electrolyte precursor as a powder. Subsequently, the powder of the electrolyte precursor was heated at 120° C. in vacuum for 2 hours, thereby giving an amorphous solid electrolyte. Furthermore, the amorphous solid electrolyte was heated at 140° C. in vacuum for 2 hours, thereby giving a crystalline solid electrolyte.

The solubility of lithium bromide in dibutyl ether was less than 0.1 mg/100 mL.

The amount of the complexing agent used is 3.3 mL relative to 1 g of the total mass of the raw material inclusion ($Li_3PS_4$, lithium bromide and lithium iodide).

Example 5

A crystalline solid electrolyte was produced in the same manner as in Example 4, except that the amount of tetramethylethylenediamine (TMEDA) used was 4.4 mL.

The amount of the complexing agent used is 2.2 mL relative to 1 g of the total mass of the raw material inclusion ($Li_3PS_4$, lithium bromide and lithium iodide).

Example 6

A crystalline solid electrolyte was produced in the same manner as in Example 4, except that the amount of tetramethylethylenediamine (TMEDA) used was 2.2 mL.

The amount of the complexing agent used is 1.1 mL relative to 1 g of the total mass of the raw material inclusion ($Li_3PS_4$, lithium bromide and lithium iodide).

Comparative Example 1

Into a stirring bar-containing Schlenk flask (capacity: 100 mL), 0.586 g of lithium sulfide, 0.945 g of diphosphorus pentasulfide, 0.185 g of lithium bromide and 0.284 g of lithium iodide were introduced in a nitrogen atmosphere. After rotating the stirring bar, 20 mL of tetramethylethylenediamine (TMEDA) was added, agitation was continued for 72 hours, and the resultant electrolyte precursor-containing slurry was dried in vacuum (at room temperature: 23° C.) to give an electrolyte precursor as a powder. Subsequently, the powder of the electrolyte precursor was heated at 120° C. in vacuum for 2 hours, thereby giving an amorphous solid electrolyte. Furthermore, the amorphous solid electrolyte was heated at 140° C. in vacuum for 2 hours, thereby giving a crystalline solid electrolyte.

The amount of the complexing agent used is 10.0 mL relative to 1 g of the total mass of the raw material inclusion (lithium sulfide, diphosphorus pentasulfide, lithium bromide and lithium iodide).

A part of each of the powder of the electrolyte precursor and the crystalline solid electrolyte obtained in Examples 1 to 3 and Comparative Example 1 was dissolved in methanol, the resultant methanol solution was subjected to gas chromatography to measure the content of tetramethylethylenediamine (complexing agent). The results are shown in Table 1.

TABLE 1

|  | Content in Electrolyte Precursor | | Content in Crystalline Solid Electrolyte | |
| --- | --- | --- | --- | --- |
|  | Complexing Agent (% by mass) | Solvent (% by mass) | Complexing Agent (% by mass) | Solvent (% by mass) |
| Example 1 | 55.0 | not detected | 1.1 | not detected |
| Example 2 | 54.0 | not detected | 1.1 | not detected |
| Example 3 | 52.0 | not detected | 1.2 | not detected |
| Comparative Example 1 | 56.0 | — | 2.0 | — |

(Crystal Structure)

Figure 2:
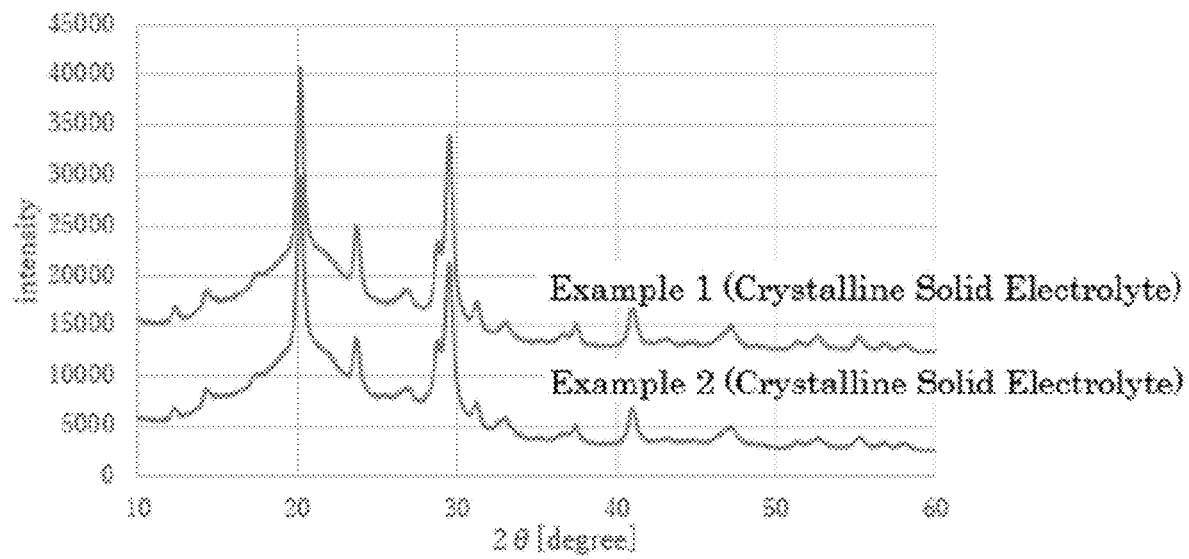
FIG. 2 shows X-ray diffraction spectra of the crystalline solid electrolytes obtained in Examples 1 and 2.
Figure 5:
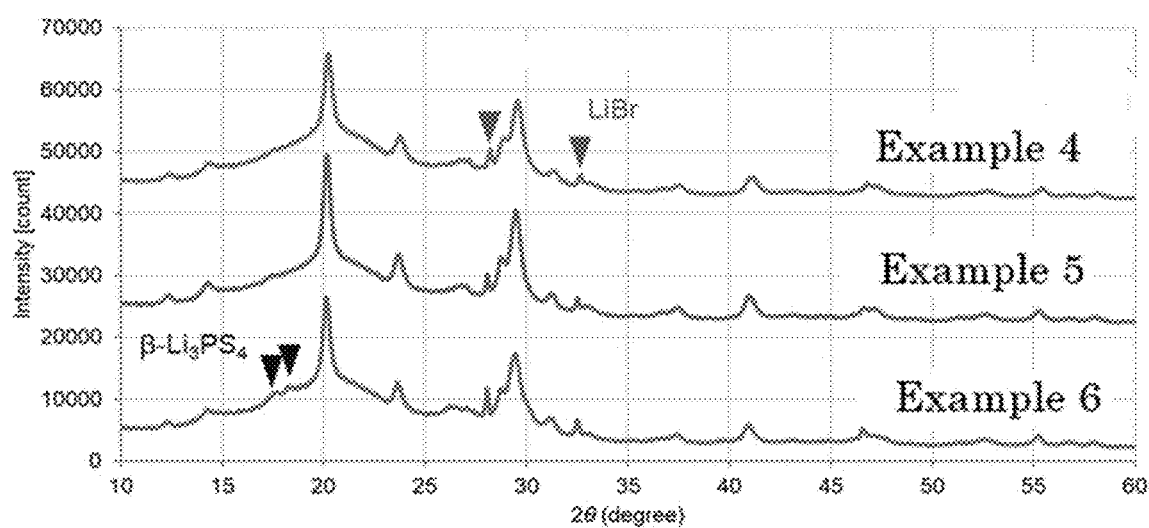
FIG. 5 shows X-ray diffraction spectra of the crystalline solid electrolyte obtained in Examples 4 to 6.

The crystalline electrolytes obtained in Examples 1, 2 and 3, the electrolyte precursor and the amorphous solid electrolyte obtained in Example 3, and the crystalline solid electrolytes obtained in Examples 4, 5 and 6 were subjected to powder X-ray diffractometry (XRD) with an X-ray diffraction (XRD) apparatus (D2 PHASER, by Bruker Japan KR), and the resultant X-ray diffraction spectra are shown in FIGS. 2, 3 and 5, which confirmed that all these had a thio-LISICON Region II-type crystal structure. In addition, the resultant amorphous solid electrolytes were subjected to composition analysis through ICP analysis (inductively coupled plasma atomic emission spectrophotometry). The results of the composition analysis are shown in Table 2.

TABLE 2

|  | Lithium Atom (% by mass) | Phosphorus Atom (% by mass) | Sulfur Atom (% by mass) | Bromine Atom (% by mass) | Iodine Atom (% by mass) |
| --- | --- | --- | --- | --- | --- |
| Example 1 | 10.2 | 13.1 | 54.0 | 8.8 | 13.9 |
| Example 2 | 10.4 | 13.1 | 54.3 | 8.8 | 13.4 |
| Example 3 | 10.4 | 13.2 | 54.4 | 9.0 | 13.0 |
| Comparative Example 1 | 10.3 | 13.1 | 54.1 | 8.8 | 13.7 |

In the X-ray diffraction spectrum of the electrolyte precursor, peaks different from the peaks derived from the raw materials used were observed, and an X-ray diffraction pattern different from those of the amorphous solid electrolyte and the crystalline solid electrolyte was shown. In addition, the raw materials used in each Example (amorphous $Li_3PS_4$, lithium bromide, lithium iodide, lithium sulfide, diphosphorus pentasulfide, crystalline $Li_3PS_4$) were also subjected to powder X-ray diffractometry (XRD), and X-ray diffraction spectra thereof are shown in FIG. 4. The X-ray diffraction spectrum of the electrolyte precursor showed an X-ray diffraction pattern different from the X-ray diffraction spectra of the raw materials.

The X-ray diffraction spectra of the amorphous solid electrolytes obtained in Examples 1 to 3 and Comparative Example 1 confirmed absence of peaks derived from the raw materials. In addition, in the X-ray diffraction spectrum of the crystalline solid electrolyte, crystallization peaks were detected mainly at 2θ=20.2° and 23.6°, and the crystalline solid electrolyte was confirmed to have a thio-LISICON Region II-type crystal structure.

(Ionic Conductivity)

The ionic conductivity of the crystalline solid electrolytes obtained in Examples 1 to 3 and Comparative Example 1 was measured as follows.

From the resultant crystalline solid electrolyte, a circular pellet having a diameter of 10 mm (cross-sectional area S: 0.785 cm$^2$) and a height (L) of 0.1 to 0.3 cm was molded to prepare a sample. From the top and the bottom of the sample, electrode terminals were taken, and the ion conductivity was measured at 25° C. according to an alternate current impedance method (frequency range: 5 MHz to 0.5 Hz, amplitude: 10 mV) to draw a Cole-Cole plot. In the vicinity of the right end of the arc observed in the high-frequency side region, a real number part Z' (Ω) at the point at which –Z" (Ω) is the smallest was referred to as a bulk resistance R (Ω) of the electrolyte, and according to the following equation, the ion conductivity σ(S/cm) was calculated.

$$R = \rho(L/S)$$

$$\sigma = 1/\rho$$

The thus-measured ionic conductivity σ is shown in Table 3.

TABLE 3

|  | Ionic Conductivity (mS/cm) |
| --- | --- |
| Example 1 | 4.1 |
| Example 2 | 3.9 |
| Example 3 | 4.6 |
| Example 4 | 3.2 |
| Example 5 | 3.4 |
| Example 6 | 2.0 |
| Comparative Example 1 | 1.7 |

As compared with that in Comparative Example 1 not using a solvent, the crystalline solid electrolytes in Example 1 using cyclohexane (boiling point 80.7° C.) as a solvent, in Example 2 using heptane (98° C.) and in Example 3 using ethylcyclohexane (boiling point 131.8° C.) had a higher ionic conductivity. The ionic conductivity in Example 3, in which the solvent used had a higher boiling point than the complexing used, was the highest.

The crystalline solid electrolytes in Examples 4 and 5 in which the raw material inclusion contained $Li_3PS_4$ and, as the solvent, an ether solvent was used, also had a higher ionic conductivity than the crystalline solid electrolyte in Comparative Example 1.

INDUSTRIAL APPLICABILITY

In accordance with the present embodiment, a crystalline solid electrolyte which is high in the ionic conductivity and excellent in the battery performance and is able to suppress the generation of hydrogen sulfide can be produced. The crystalline solid electrolyte obtained by the production method of the present embodiment is suitably used for batteries, especially batteries to be used for information-related instruments, communication instruments and others, such as personal computers, video cameras, and mobile phones.

The invention claimed is:

1. A method for producing a solid electrolyte, comprising mixing a raw material inclusion comprising a lithium atom, a sulfur atom, a phosphorus atom and a halogen atom with a complexing agent and a solvent, wherein:
   the amount of the complexing agent is 0.1 mL or more and 4.0 mL or less relative to 1 g of the total mass of the raw material inclusion, and
   the halogen atom is provided by a lithium halide or a halogen molecule, and wherein the method further comprises removing a liquid component of the complexing agent, after said mixing.

2. The method for producing a solid electrolyte according to claim 1, wherein the halogen atom is provided by the lithium halide and the solubility of the lithium halide at 25° C. in the solvent is smaller than the solubility of the lithium halide at 25° C. in the complexing agent.

3. The method for producing a solid electrolyte according to claim 1, wherein the boiling point of the solvent is higher than the boiling point of the complexing agent.

4. The method for producing a solid electrolyte according to claim 1, wherein the solvent contains two or more solvent species and at least one solvent species has a boiling point higher than that of the complexing agent.

5. The method for producing a solid electrolyte according to claim 1, further comprising obtaining a slurry of the solvent and an electrolyte precursor by removal of the liquid component of the complexing agent.

6. The method for producing a solid electrolyte according to claim 5, comprising further removing the solvent from the slurry of the solvent and the electrolyte precursor to give the electrolyte precursor.

7. The method for producing a solid electrolyte according to claim 5, further comprising heating the electrolyte precursor.

8. The method for producing a solid electrolyte according to claim 5, wherein the content of the complex in the electrolyte precursor is 30 to 80% by mass based on the total amount of the electrolyte precursor.

9. The method for producing a solid electrolyte according to claim 1, wherein the halogen atom is provided by the lithium halide and the solubility of the lithium halide at 25° C. in the solvent is less than 0.5 g/100 ml.

10. The method for producing a solid electrolyte according to claim 1, wherein the solvent comprises an ether solvent or a hydrocarbon solvent.

11. The method for producing a solid electrolyte according to claim 10, wherein the solvent comprises a hydrocarbon solvent and the hydrocarbon solvent comprises one or more selected from an aliphatic hydrocarbon solvent, an alicyclic hydrocarbon solvent and an aromatic hydrocarbon solvent.

12. The method for producing a solid electrolyte according to claim 1, wherein the raw material inclusion comprises two or more kinds of halogen atoms.

13. The method for producing a solid electrolyte according to claim 1, wherein the raw material inclusion comprises one or more kinds of lithium halides.

14. The method for producing a solid electrolyte according to claim 1, wherein the raw material inclusion comprises at least one selected from lithium sulfide, phosphorus sulfide, a phosphorus halide, a halogen molecule, amorphous $Li_3PS_4$ and crystalline $Li_3PS_4$.

15. The method for producing a solid electrolyte according to claim 1, wherein the complexing agent comprises a hetero atom-containing compound.

16. The method for producing a solid electrolyte according to claim 1, wherein the complexing agent comprises an amino group-containing compound.

17. The method for producing a solid electrolyte according to claim 1, wherein the complexing agent comprises a compound having at least two tertiary amino groups in the molecule.

18. The method for producing a solid electrolyte according to claim 1, wherein the solvent is present in an amount of 0.1 to 50 mL relative to 1 g of the total mass of the raw material inclusion.

19. The method for producing a solid electrolyte according to claim 1, wherein the solid electrolyte comprises a thio-LISICON Region II-type crystal structure.

20. The method for producing a solid electrolyte according to claim 1, wherein the solid electrolyte does not have a diffraction peak at $2\theta=17.5°$ and $26.1°$ in X-ray diffractometry using a CuKa ray.

21. A method for producing a solid electrolyte, comprising mixing a raw material inclusion comprising a lithium atom, a sulfur atom, a phosphorus atom and a halogen atom with a complexing agent and a solvent, wherein:
the amount of the complexing agent is 0.1 mL or more and 4.0 mL or less relative to 1 g of the total mass of the raw material inclusion, and
the halogen atom is provided by a lithium halide or a halogen molecule, and
wherein the boiling point of the solvent is higher than the boiling point of the complexing agent.

* * * * *